(12) United States Patent
Baun et al.

(10) Patent No.: US 7,221,527 B2
(45) Date of Patent: May 22, 2007

(54) SYSTEMS AND METHODS FOR AUTOMATED TELESCOPE ALIGNMENT AND ORIENTATION

(75) Inventors: Kenneth W. Baun, Trabuco Canyon, CA (US); John E. Hoot, San Clemente, CA (US)

(73) Assignee: Meade Instruments Corporation, Irvine, CA (US)

( * ) Notice: Subject to any disclaimer, the term of this patent is extended or adjusted under 35 U.S.C. 154(b) by 0 days.

(21) Appl. No.: 11/189,005

(22) Filed: Jul. 25, 2005

(65) Prior Publication Data

US 2006/0001956 A1  Jan. 5, 2006

Related U.S. Application Data

(63) Continuation of application No. 09/771,385, filed on Jan. 26, 2001, now Pat. No. 6,922,283, which is a continuation-in-part of application No. 09/428,866, filed on Oct. 26, 1999, now Pat. No. 6,392,799.

(60) Provisional application No. 60/105,626, filed on Oct. 26, 1998, provisional application No. 60/143,637, filed on Jul. 14, 1999, provisional application No. 60/178,840, filed on Jan. 26, 2000.

(51) Int. Cl.
*G02B 23/00* (2006.01)

(52) U.S. Cl. .................................... 359/900; 359/900

(58) Field of Classification Search ............... 359/399, 359/429, 900; 250/203.1
See application file for complete search history.

(56) References Cited

U.S. PATENT DOCUMENTS

| | | | |
|---|---|---|---|
| 4,074,128 A | 2/1978 | Harris et al. | |
| 4,473,786 A | 9/1984 | Miyashita et al. | |
| 4,536,847 A | 8/1985 | Erickson et al. | |
| 4,541,294 A | 9/1985 | Byers | |
| 4,682,091 A | 7/1987 | Krewalk et al. | |
| 4,764,881 A | 8/1988 | Gagnon | |
| 4,779,031 A | 10/1988 | Arends et al. | |
| 4,991,948 A | 2/1991 | Hügenell | |
| 5,133,050 A | 7/1992 | George et al. | |
| 5,254,919 A | 10/1993 | Bridges et al. | |
| 5,347,286 A | 9/1994 | Babitch | |

(Continued)

FOREIGN PATENT DOCUMENTS

GB    2 056 109 A    3/1981

(Continued)

OTHER PUBLICATIONS

CCD Polar alignment. http://www.ucihs.uci.edu/pandb/hall/polar.htm. Oct. 2, 1999.*

(Continued)

*Primary Examiner*—Mark A. Robinson
(74) *Attorney, Agent, or Firm*—Knobbe, Martens, Olson & Bear LLP

(57) ABSTRACT

Embodiments of an automated telescope system are operable in multiple modes, including alt-az and equatorial modes. The telescope system aligns and orients itself to the celestial coordinate system using, for example, data gained through tracking the drift of a celestial object. In various embodiments, an imager may be used to find and track celestial objects.

8 Claims, 11 Drawing Sheets

U.S. PATENT DOCUMENTS

| | | | |
|---|---|---|---|
| 5,367,407 | A | 11/1994 | Hügenell |
| 5,446,465 | A | 8/1995 | Diefes et al. |
| 5,537,250 | A | 7/1996 | Masunaga et al. |
| 5,555,160 | A | 9/1996 | Tawara et al. |
| 5,574,465 | A | 11/1996 | Okada |
| 5,809,457 | A | 9/1998 | Yee et al. |
| 5,822,116 | A | 10/1998 | Leblanc |
| 5,828,814 | A | 10/1998 | Cyman et al. |
| 5,907,433 | A | 5/1999 | Voigt et al. |
| 5,912,541 | A | 6/1999 | Bigler et al. |
| 5,956,177 | A | 9/1999 | Nishikata et al. |
| 5,983,071 | A | 11/1999 | Gagnon et al. |
| 6,016,120 | A | 1/2000 | McNabb et al. |
| 6,049,306 | A | 4/2000 | Amarillas |
| 6,108,277 | A | 8/2000 | Whitmore |
| 6,369,942 | B1 | 4/2002 | Hedrick et al. |
| 6,392,799 | B1 | 5/2002 | Baun et al. |
| 6,603,602 | B1 | 8/2003 | McWilliams |
| 6,972,902 | B1 | 12/2005 | Chen et al. |

FOREIGN PATENT DOCUMENTS

| | | |
|---|---|---|
| GB | 2 141 260 A | 12/1984 |
| GB | 2 320 589 A | 6/1988 |
| GB | 2 318 423 A | 4/1998 |
| JP | 58057107 A | 4/1983 |
| JP | 59015215 A | 1/1984 |
| JP | 60201317 A | 10/1985 |
| JP | 61091616 A | 5/1986 |
| JP | 62018515 A | 1/1987 |
| JP | 62168109 A | 7/1987 |
| JP | 63143610 A | 6/1988 |
| JP | 01032219 A | 2/1989 |
| JP | 01051507 A | 2/1989 |
| JP | 02035409 A | 2/1990 |
| JP | 03223808 | 10/1991 |
| JP | 04096013 A | 3/1992 |
| JP | 04106513 A | 4/1992 |
| JP | 04306612 A | 10/1992 |
| JP | 0501977 A | 1/1993 |
| JP | 05019856 A | 1/1993 |
| JP | 05312566 A | 11/1993 |
| JP | 06331904 A | 12/1994 |
| JP | 07129083 A | 5/1995 |
| JP | 08076019 A | 3/1996 |
| JP | 08122652 A | 5/1996 |
| JP | 08201703 A | 8/1996 |
| JP | 08292376 A | 11/1996 |
| JP | 11072718 A | 3/1999 |

OTHER PUBLICATIONS

Drift alignment method (J. Scheiner). http://leq.one-arcsec.org/e/Methods/Scheiner/scheiner_e.html. Mar. 10, 2005.*

B.P. "Equations for Pointing Telescope" by Toshimi Taki, Telescope Making: Revision A: Jan. 12, 2002; pp. 1-7.

BQ "Integrated Motor Controller Amplifier", The Animatics SmartMotor Brushless D.C. Servo Motor; Aug. 1998; pp. 1-16.

BS Usernet Postings by John Hoot, http://groups.google.com/groups?q=group;*meade*,+OR+group:*astro*+author:hoot&num=100&h; pp. 1-21.

BT "Partical Astronomy With Your Calculator" by Peter Duffet-Smith, Cmabridge University Press; Cambridge, United Kingdom (Third Edition 1988); pp. i-iii and 25-49.

BU "A Radical Approach to Software Modularity in Telescope Control Software" by Mark H. Clark, Nikos Drakos, Computer Based Learning Unit, University of Leeds, Copyright 1997, generated using the LaTeX2HTML translator Version 98.1p5 (May 15th, 1998); translation intiated by Mark H. Clark on Dec. 15, 1998; http:///www.gb.nrao.edu/~mclark/clarkmh/node4/html; pp. 1-3.

BV "Star Wars the Amateur Astronomer's Ultimate Guide to Choosing, Buying, and Using Telescopes and Accessiories" by Philip S. Harrington, John Wiley & Sons, Inc. Canada (Second Edition 1998); pp. i-iii, 9-21,41-47, 51-110, and 156-158.

BW "Distributed Control Enables Flexible Intelligent System Development" by Jeffrey N. Callen, RedZone Robotics, Inc.; 2425 Liberty Ave., Pittsburgh, PA 15222 USA; IEEE Intelligent Systems magazine, Jul./Aug. 1998; pp. 1-8.

BX "Electronic Controls in Appliances: Central vs. Decentralized Processing" by Damon Chu, Microchip Technology, Inc. Microchip News & Events: http://www.microchip.com/11110/edit/proceed/archive/9_180/index.htm (Oct. 30, 2001): pp. 1-10.

By Distributed Control: by Daryl Prince, Mechanical Engineering: The American Society of Mechanical Engineers (1999); http://ww.memagazine.org/backissues/january99/features/distributed/distributed/html (Nov. 27, 2001); pp. 1-5.

BZ "Extremely Small, Low Cost Electronics Enable First-Time Intelligence Design in Mechanical Applications" Editior Contract: Eric Sells, Microchip Technology, Inc.; Microchip; News & Events Microchip Press Release Library (Chandler, AZ, Jul. 6, 1998 [NASDAQ:MCHP]; http://www.microchip.com/111110/edit/prelease/archive/9_75/index.htm (Nov. 27, 2001; pp. 1-2.

CA "Telescopes 1996 Celestron" Utima 2000-8, Celestron International, Torrance, CA Copyright 1996; Item #93895-96; pp. 1 and 24-25.

CB "Telescope Celestron" Ultima 8-PEC, Ultima 11-PEC, C14/Compustar 14, Celestron International, Torrance, CA; Copyright 1993; Item 93895 93; pp. 1, 26-27, 30-31, 38-39.

CC "Astronomy" (Is There A Tenth Planet? Perfect Prospects For the Perseids), Aug. 1988 (ICD 08070); pp. 1-3.

CD "Meade's LX200 vs. Celestron's Ultima" by Alan Dyer, Sky & Telescrope; co-author: Advanced Skywatchin; pp. 1-14.

CE "Celestron's Ultima 2000 Computerized Telescope" by Alan Dyer, Adapted from Sky & Telescope, Nov. 1997; pp. 1-10.

CF "DC Servo Motor Control Application Brief" PIC17C756A; Microchip Technology Inc.; Market: Motion Control (1998); pp. 1-2.

CG "Introduction to the Embedded Control Solutions Company", Microchip Technology Inc.; 1997; pp. DS00270- pp. 1-1 DS00583A- p. 4-318.

Ch "Paramount GT-1100 Robotic Telescope Mount Users' Guide Rev. 1.2" TPoint Software and Software Bisque; Copyright Jan. 1998; pp. 1-32.

CI "Celestron Compustar Computer Controlled Telescopes Instruction Manual" Celestron International, Manual #94067, Jun. 1988; pp. 1-75.

CQ Blueprints of VATT Counterweight System, Counterweight Power Amplifier and VATT Power Amplifier Dome, Steward Observatory, University of Arizona, pp. 1-5.

CR "LM628/LM629 Precision Motor Controller" National Semiconductor Corporation, Feb. 1995, pp. 1-24.

CS "LM628 Programming Guide, Application Note 693" by Steven Hunt, National Semiconductor Corporation, Apr. 1991, pp. 1-23; pp. 1-5.

CT Series 9330/9331 High Resolution Analog Input Board-User's Manual Acromag, pp. 0.1-0.6; 1.1-1.2, 2.1-2.16; 3.1-3.16, 4.1-4.5, 5.1-5.8, 6.1-6.2, 7.1-7.4

CU "Blueprints of VATT Counterweight System and Counterweight Power Amplifier" Steward Observatory, University of Arizona, pp. 1-2.

CV Blueprint of Mirror Cell, Steward Observatory, University of Arizona, pp. 1-3.

U.S. District Court Civil Docket Sheet, Central District of California, Southern Division, for *Meade Instruments Inc.* v. *Celestron Int'l. Inc.*, SA CV 02-544 GLT (MLGx).

U.S. District Court Civil Docket Sheet, Central District of California, Southern Division, for *Meade Instruments Inc.* v. *Celestron Int'l. Inc.*, SA CV 02-558 GLT (MLGx).

Celestron's Response to Meade's First Set of Interrogatories, dated Mar. 21, 2003, including Exhibits 1-2.

Initial Disclosures of Celestron, dated Jan. 30, 2003.

Celestron Counterclaim for: (1) Declaration of Non-Infringement of Patent (2) Declaration of Invalidity of Paten and (3) Design Patent Infringement, dated Oct. 09, 2002.

Celestron's Memorandum of Points and Authorities in Opposition to Meade's Motion for Preliminary Injunction, dated Nov. 25, 2002.

Declaration of Mark Trueblood in Opposition to Meade's Preliminary Injunction, dated Nov. 22, 2002, including Exhibits 9-11.

Declaration of David Harvey in Opposition to Meade's Preliminary Injunction, dated Nov. 24, 2002, including Exhibits 16-28.

Declaration of Q. Todd Dickinson in Opposition to the Motion of Plaintiff Meade Instruments Corporation for a Preliminary Injunction, dated Nov. 24, 2002, including Exhibits 6-17.

Declaration of Richard Hedrick in Opposition to Meade's Preliminary Injunction, dated Nov. 24, 2002, including Exhibits 3-7.

Reply Declaration of Sergio Restaino, Ph.D., in Support of Meade's Motion for Preliminary Injunction, dated Dec. 06, 2002.

Russell Genet, "Real Time Control With the TRS-80," Chapter 10, The Mark I Photometric System (1982).

Fred W. Klein, "Pocket Computer Programs for Astronomers, Program ALTAZ" (1982).

"The Elements of Astronomy," (Fifth Edition, McGraw-Hill, 1955), pp. 81-82.

Meade Instrument Corporation, "Instruction Manual for 7" LX200 Maksutov-Cassegrain Telescope and 8", 10", and 12" LX200 Schmidt-Cassegrain Telescopes."

Jean Meeus, Astronomical Algorithms (Wilmann-Bell, 1991).

Mark Trueblood & Russell Merle Genet, "Telescope Control," (Wilmann-Bell, 1997).

Paul Burke, "Alt-Azimuth Setting Circles," Astronomy Magazine (Apr. 1982).

Bill Burton, "Ready, Compute, Aim," Astronomy Magazine (Jul. 1988).

M.J. Ellis, G.R. Hovey, and T.E. Stapinsky, "MTEC: A Microprocessor System for Astronomical Telescope and Instrument Control," IEEE Transactions on Computers, vol. C-29, No. 2 (Feb. 1980).

Roger Sinnott, "Astronomical Computing," Sky and Telescope Magazine (Feb. 1989).

Bill Arnett, Usenet posting in sci.astro.amateur (Apr. 8, 1996).

Paul Goelz, Usenet posting in alt.telescopes.meade.lx1×200 (Aug. 13, 1996).

Don Tabbutt, Usenet posting in sci.astro.amateur (Sep. 20, 1997).

Tom Krajci, Amateur Telescope Makers ("ATM") communication in archives at geocrawler.com (Apr. 29, 1998).

Microchip Technology Inc. documentation (pages numbered C50874-C51264).

J.O. Straede and P.T. Wallace, The Anglo-Australian 3.9-Meter Telescope: Software Controlled Slewing, Setting, and Tracking, *Publications of the Astronomical Society of the Pacific* (Oct. 1976) (CA01022-32).

S.C. West, et al., "Progress at the Vatican Advanced Technology Telescope," *SPIE* vol. 2871 (CA01033-44).

H.A. McAlister, et al., "The CHARA" (Feb. 25, 1994) (CA01045-55).

J. Davis, et al., "The Sydney University Stellar Interferometer," *SPIE* vol. 3350 (Mar. 1998) (CA01056-62).

J. Davis, et al., "Progress in Commissioning the Sydney University Stellar Interferometer (SUSI)," *SPIE* vol. 2200 (CA01063-73).

John Davis, et al., "The Sydney University Stellar Interferometer Program," *Interferometry In Optical Astronomy*, *SPIE* vol. 4006 (2000) (CA01074-81).

C. Mayer, et al., "The Gemini Telescope Control System," *ASP Conference Series*, vol. 101 (1996) (CA01082-85).

What appear to be block/curcuit diagrams related to the Vatican Observatory (CA01086-90).

National Semiconductor documentation, "LM628/LM629 Precision Motion Controller," (Feb. 1995) (CA01148-70).

"LM628 Programming Guide,"(Apr. 1991) (CA01172-01213).

Acomag User's Manual for Series 9330/9331 High Resolution Analog Input Board (CA01228-87).

Apparent circuit diagrams for Stewart Observatory/Vatican Observatory (CA01308-09).

Further apparent circuit diagrams and handwritten notes for Stewart Observatory/Vactican Observatory (CA01310-12).

Copending Application Ser. No. 10/357,912, filed Feb. 4, 2003.

Copending Application Ser. No. 10/358,754, filed Feb. 5, 2003.

Abandoned U.S. Appl. No. 09/428,865, filed Oct. 26, 1999.

Abandoned U.S. Appl. No. 10/379,204, filed Mar. 4, 2003.

* cited by examiner

SYSTEMS AND METHODS FOR AUTOMATED TELESCOPE ALIGNMENT AND ORIENTATION

CROSS-REFERENCE TO RELATED APPLICATIONS

The present application claims priority benefit under 35 U.S.C. § 120 to, and is a continuation of U.S. patent application Ser. No. 09/771,385, filed Jan. 26, 2001 now U.S. Pat. No. 6,922,283, entitled "Systems and Methods for Automated Telescope Alignment and Orientation," (the "Parent Application"), which is a continuation-in-part of U.S. patent application Ser. No. 09/428,866, filed Oct. 26, 1999, entitled "Fully Automated Telescope System with Distributed Intelligence," now U.S. Pat. No. 6,392,799, which claims priority benefit under 35 U.S.C. § 119(e) from U.S. Provisional Application Nos. 60/105,626, filed Oct. 26, 1998 entitled "Fully Automated Telescope System With Distributed Intelligence," and 60/143,637, filed Jul. 14, 1999, entitled "Self Orienting, Self Aligning, Intuitive Automated Telescope." The Parent Application also claims priority benefit under 35 U.S.C. § 119(e) from U.S. Provisional Application No. 60/178,840, filed Jan. 26, 2000, entitled "Systems and Methods for Automated Telescope Alignment and Orientation." The present application also incorporates each of the foregoing application herein by reference.

BACKGROUND OF THE INVENTION

1. Field of the Invention

The present invention relates to automated telescope systems and, more particularly, to systems and methods for aligning and orienting such automated telescope systems.

2. Description of the Related Art

The continuing evolution of low cost, high performance integrated circuit processors has enabled the recent introduction of fully automated telescope systems which are capable of performing alignment and orientation operations under software program control with a minimum of intervention by a user. Telescope systems are able to perform alignment and orientation functions regardless of whether they might be configured as an alt-azimuth telescope or as an equatorial telescope. The system is provided with sufficient processing power and with a multiplicity of application routines, such that alignment and orientation is performed with regard to a large number of different algorithms and with respect to a variety of user definable data-type inputs.

Such telescope systems might be described as intelligent, in that they typically include a command module which is a fully functional microprocessor controlled command unit, capable of executing high level application software routines and performing numerous data processing tasks, such as numerical calculations, coordinate system transformations, database manipulations, and managing the functional performance of various different peripherally coupled devices.

Central interface panels might be provided on the telescope systems which support interconnection between and among various intelligent motor modules, command modules and peripheral devices. Communication between and among component parts is made over serial data and control communication channels in accordance with a packet-based serial communication protocol. An RS-232 port is also provided such that a command module is able to communicate with ancillary RS-232 capable devices such as personal computer systems.

Use of the various communication channels allows the telescope system to communicate with other devices in order to exchange stored information, exchange created and stored operating routines, obtain updates to programs and/or internal databases, and the like. In this regard, such computer systems include a number of internal databases, including at least one database of the celestial coordinates (RA and DEC) of known celestial objects that might be of interest to an observer. Further, the system might include a database of the geographical coordinates (latitude and longitude) of a large body of geographical landmarks. These landmarks might include known coordinates of cities and towns, carte graphic features such as mountains, and might also include the coordinates of any definable point on the earth's surface whose position is stable and geographically determinable. Each of the databases are user accessible such that additional entries of particular interest to a user might be included.

Distributed intelligence might be further characterized in that the telescope system hand-held command module might be provided in two separate configurations. The first configuration might be termed a simplified configuration, and might be functionally limited in that it is able to provide direction and speed commands to the intelligent motor modules, but might only be provided with limited operational command processing capabilities so as to offer a low-cost alternative. In this particular configuration, system intelligence would reside primarily in the motor modules, with the command module functioning more as a steering guidance control, or directional joystick. However, even given its reduced computational elegance, the simplified command module is nevertheless capable of executing a wide variety of command instructions including those relating to numerical processing and arithmetic calculations.

In particular, the solution to any given problem in celestial trigonometry depends on being able to convert measurements obtained in one coordinate system (Alt-Az, for example) into a second coordinate system (the celestial coordinate system). Performing such coordinate system transformations is well within the capability of limited functionality processors such as might be provided with a limited intelligence command module.

Accordingly, limited intelligence command modules should be able to support various alignment and orientation schemes so as to allow a simplified automated telescope system the ability to align and orient it self with respect to the celestial sphere and provide a relatively unsophisticated user with capability of, at least, tracking a designated viewing object throughout its determinable motion across the night sky.

BRIEF DESCRIPTION OF THE DRAWINGS

These and other features, aspects and advantages of the present invention will be more fully understood when considered with respect to the following detailed description and accompanying drawings wherein.

DETAILED DESCRIPTION OF THE PREFERRED EMBODIMENT

The detailed descriptions of an automated telescope system with distributed intelligence and alignment, orientation and tracking ability, set forth below in connection with the appended drawings are intended only as a description of the presently preferred and illustrated embodiments of the invention, and are not intended to represent the only form in which the present invention may be constructed or utilized. The detailed descriptions set forth the construction and function of the invention, as well as the sequence of steps utilized in its operation, in conjunction with the illustrated embodiments. It is to be understood by those having skill in the art, that the same or equivalent functionality may be accomplished by various modifications to the exemplary embodiments without departing from the spirit and scope of the invention.

Figure 1:
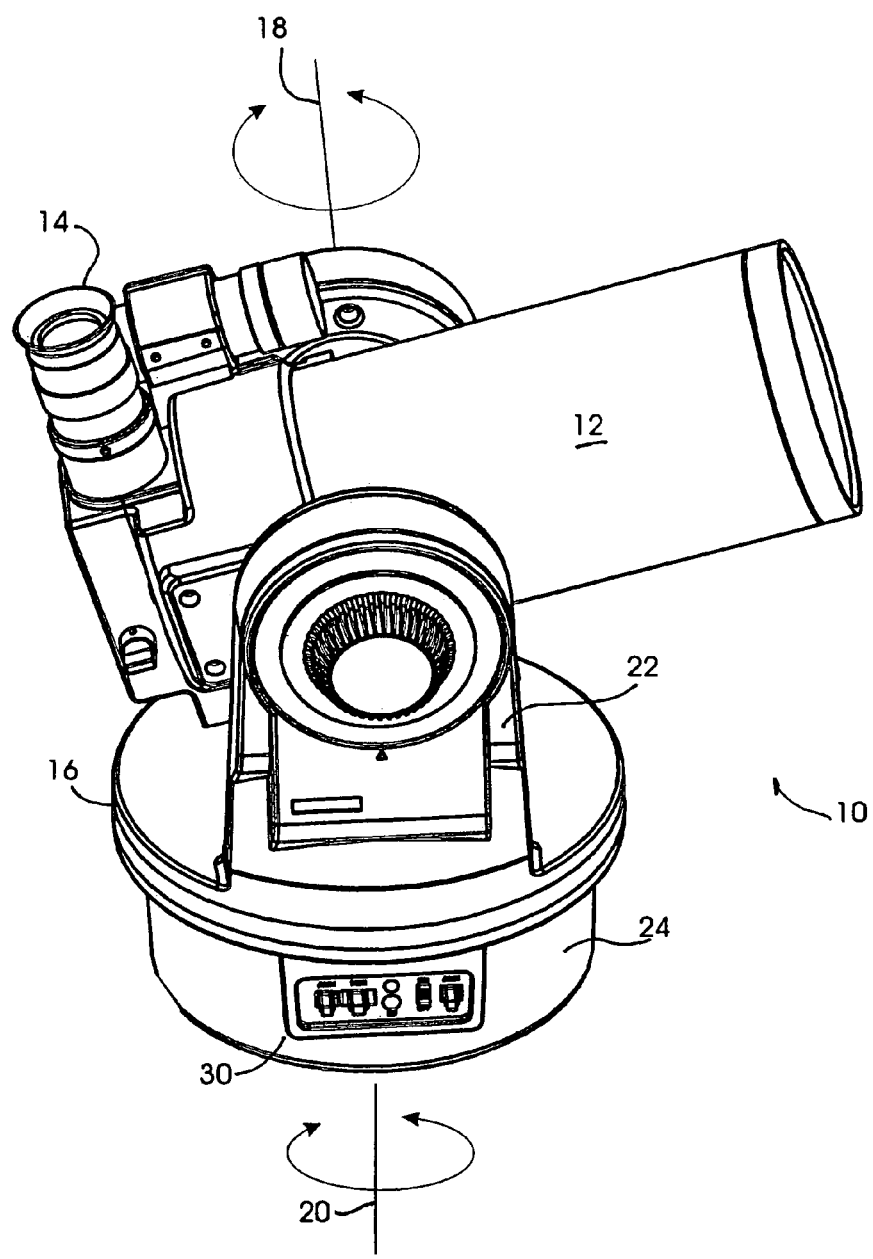
FIG. 1 is a semi-schematic perspective view of one embodiment of a reflecting-type telescope system in accordance with the present invention.

An automated telescope system, with distributed intelligence and a control system for operating such a telescope, will now be described with reference to the embodiments illustrated in the figures. In FIG. 1, a telescope system 10 for observing celestial and terrestrial objects is provided in accordance with the present invention. Telescope system 10 suitably comprises a telescope tube 12 which houses the optical system required for resolving distant objects and further includes a focusing objective and eyepiece 14 coupled to the optical system in a manner to allow the observation of the optical system's focal plane. The telescope tube 12 is supported by a mount 16 which facilitates movement of the telescope tube 12 about two orthogonal axes, a substantially vertical axis, termed an azimuth axis and a substantially horizontal axis, termed an altitude axis.

As those having skill in the art will appreciate, the horizontal and vertical axes of the mount 16 in combination, define a gimbaled support for the telescope tube 12 enabling it to pivot in a horizontal plane defined by the vertical (or azimuth) axis and, independently, to pivot through a vertical plane defined by the horizontal (altitude) axis.

It should be noted, at this point, that telescope system 10 is illustrated as comprising a telescope tube 12 configured as a reflecting-type telescope, particularly a Maksutov-Cassegrain telescope. In this regard, the form of the telescope's optical system, per se is not particularly relevant to practice of principles of the present invention. Thus, even though depicted as a reflector, the telescope system 10 of the present invention is eminently suitable for use with refractor-type telescope optical systems. The specific optical systems used might be Newtonian, Schmidt-Cassegrain, Maksutov-Cassegrain, or any other conventional reflecting or refracting optical system configured for telescopic use.

In the telescope system embodied in FIG. 1, it is convenient to support the telescope tube and mount combination in such a manner that the vertical axis 18 is, indeed, substantially vertical such that the telescope pivots (or rotates) about the vertical axis in the plane which is substantially horizontal. A tripod conventionally functions to support the mount 16 such that the azimuth axis 18 is substantially orthogonal to a horizontal plane, relative to the user of a telescope system. The tripod is conventionally configured to include three supporting legs, which are arranged in a triangular pattern. Each of the legs are independently adjustable for leveling the mount 16 in order to conform to the nature of the surface upon which the telescope system 10 is used.

In addition to supporting telescope motion about two orthogonal axes, the mount 16 is constructed to include an electrical interface junction panel 30 which allows various electronic components comprising the telescope system to be interconnected and to support interoperability. The electrical interface junction panel 30 is configured to support upgradeability of the telescope system 10 to a fully intelligent automatic telescope system in a series of logically consistent steps, each of which results in a fully functional telescope system having a greater or lesser degree of intelligence and/or functionality, depending upon where, along the upgrade spectrum, a user would achieve the most subjectively desirable ratio of system complexity as a function of functional benefit.

Figure 2:
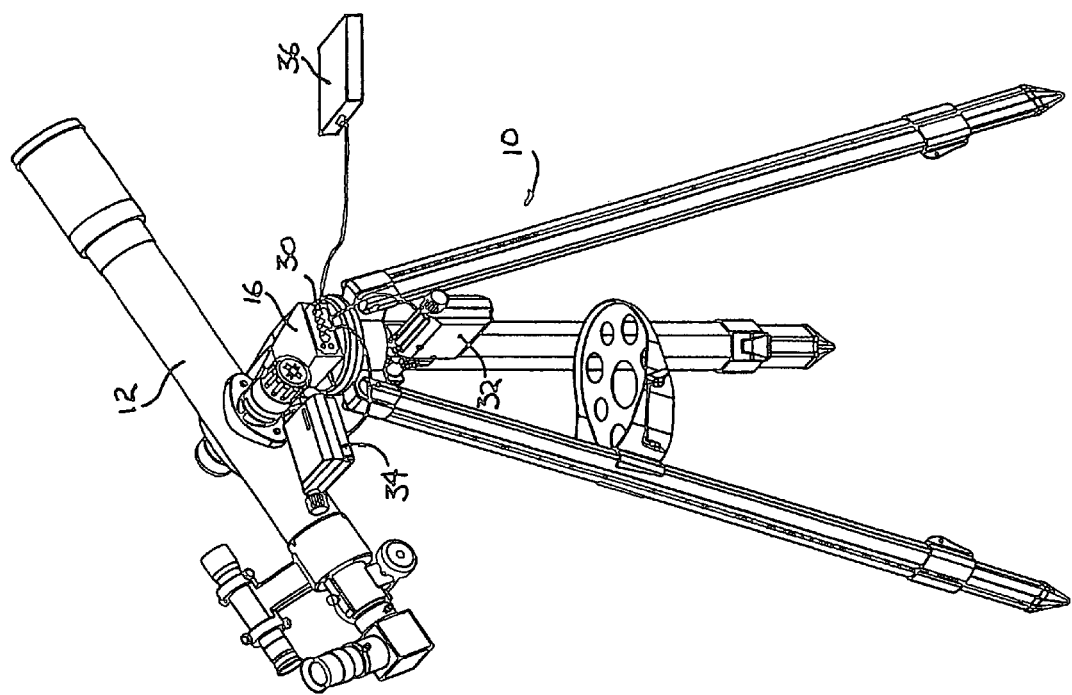
FIG. 2 is a semi-schematic perspective view of a second embodiment of a refracting-type telescope system in accordance with the invention.

Turning now to FIG. 2, there is depicted a semi-schematic perspective view of a refracting-type telescope system suitable for practice of principles of the invention. Since telescopes are fungible in the context of the invention, like elements such as the telescope tube 12, mount 16, azimuth axis 18 and altitude axis 20, will be identified with the same numerals as the corresponding telescope system of FIG. 1. Additionally, the telescope system of FIG. 2 includes semi-intelligent motor portions for pivotally moving the telescope about the azimuth axis 18 and altitude axis 20. Semi-intelligent motor portions suitably comprise a semi-intelligent, self-contained azimuth axis drive motor 32 and a semi-intelligent, self-contained altitude axis drive motor 34. Each of the drive motor assemblies 32 and 34 are self-contained motor packages including a DC brush-type motor, an associated electronics package hosted on a printed surface board, a drive and reduction gear assembly and an optical encoder assembly, configured together in a housing in a manner according to co-pending patent application entitled "Intelligent Motor Module For Telescope Axial Rotation," Ser. No. 09/428,866, filed on Oct. 26, 1999 and commonly owned by the assignee of the present invention, the entire of disclosure of which is expressly incorporated herein by reference.

The semi-intelligent motor assemblies 32 and 34 are each affixed to the telescope mount 16 and coupled to the azimuth and altitude axes, 18 and 20, respectively, so as to be able to pivotally move the telescope tube 12 about the corresponding axis when the motor assembly is activated. Each of the motor assemblies 32 and 34 are plugged into respective corresponding receptacles in the electrical interface junction panel 30 which, in a manner to be described in greater detail below, functions as a signal interface for the motor assemblies as well as providing power and ground thereto.

The electrical interface junction panel 30 allows motor control signals to be directed to each of the motor assemblies 32 and 34, the motor control signals providing speed and direction information to the electronics package which, in turn, provides appropriate activation signals to the respective DC motor comprising each motor assembly. The electrical interface junction panel 30 further allows for signal communication between each respective one of the motor assemblies 32 and 34 and a hand-held system control unit 36.

In operation, a user plugs the hand-held system control unit 36 into an appropriate receptacle of the electrical interface junction panel 30 and further plugs the motor assemblies 32 and 34 into the respective receptacles, thus completing a signal path between each of the motor assemblies and the system control unit 36. Motion commands are provided to the system by the user, by accessing the appropriate function provided on the hand-held system control unit 36. Signals corresponding to the desired motion are directed by the control unit 36 to the appropriate motor assembly through the electrical interface junction panel 30. For example, if a user desires to slew the telescope in a counter-clockwise direction, he may enter a command into the control unit 36 telling the telescope system to move "left". In response, the azimuth axis motor assembly 32 is commanded to activate its integral motor in order to rotate the telescope in a particular direction, thus causing the telescope mount to pivot in a counter-clockwise fashion about the azimuth axis 18. In like manner, when a user desire to elevate the telescope 12 in an upwardly direction, the user would enter the appropriate "up" command into the control unit 36 thus activating the altitude motor assembly 34 which, in turn, causes the telescope to pivot upwardly about the altitude axis 20.

Returning momentarily to the exemplary telescope embodiment of FIG. 1, it should be understood that the telescope system depicted therein comprises an integrated telescope such that the altitude and azimuth motors are disposed within a vertically positioned fork arm 22 and the telescope mount base 24, respectively. Accordingly, there is no requirement to connect the azimuth and altitude motors to the electrical interface junction panel 30 in the particular embodiment of FIG. 1. Motor wiring is accommodated internal to the structure of the mount (including the fork arm 22 and base 24) and the system's electronic components are packaged accordingly.

Figure 3A:
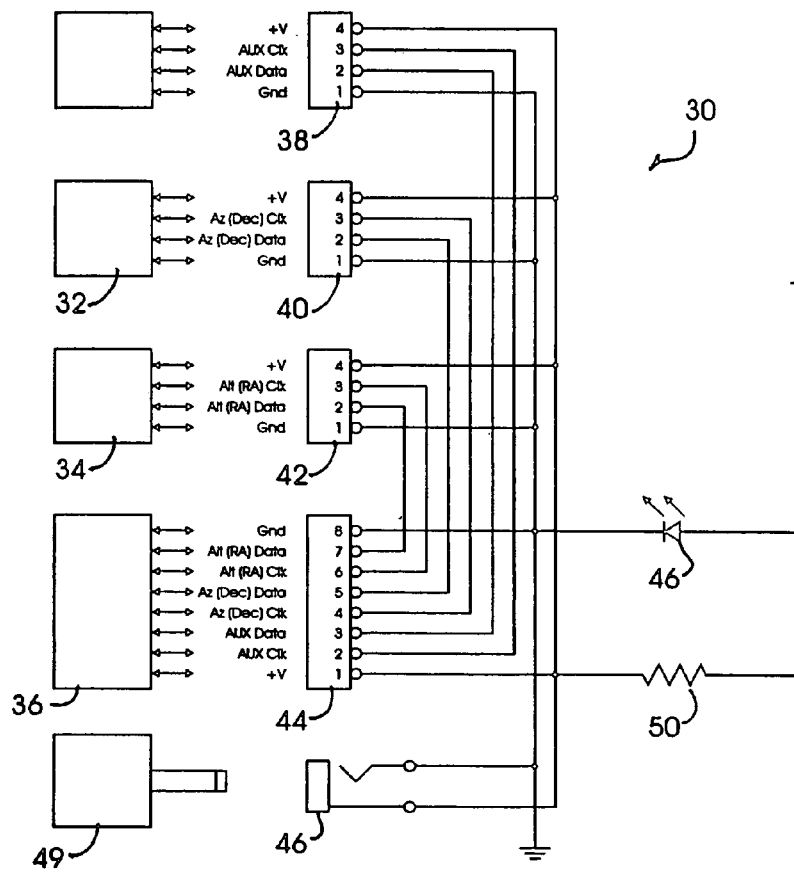
FIG. 3a is a semi-schematic block diagram of the signal and bus configuration an the electrical interface panel of the telescope system of FIG. 2.
Figure 3B:
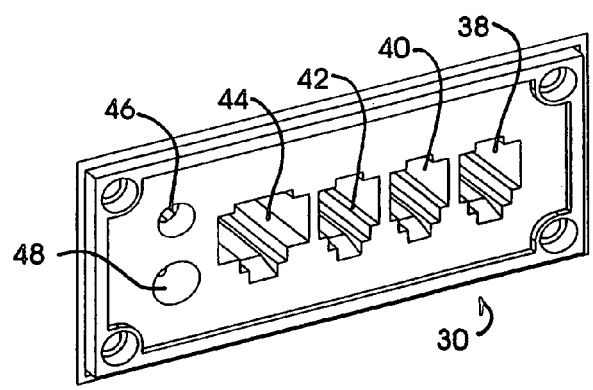
FIG. 3b is a semi-schematic partial perspective view of an electrical interface panel of the telescope system of FIG. 2.

Turning briefly now to FIGS. 3a and 3b the mechanical and electrical configuration of the electrical interface junction panel embodiment of the telescope system of FIG. 2 are illustrated. It can be understood from FIG. 3a that the interface junction panel 30 suitably comprises 4 RJ11-type connector receptacles with 3 of the receptacles 38, 40 and 42 comprising 4-pin RJ11 connectors and one of the receptacles 44 comprising an 8-pin RJ11 connector. In addition to the RJ11 connections, the electrical interface junction panel includes a "mini-pin" type 12 volt power receptacle 46 and a visible "power present" indicator comprising an LED 48 mounted to shine through a recessed opening in the panel located proximate to the power pin 46.

FIG. 3b illustrates the electrical connections made between and among the 4-pin RJ11 connectors, the 8-pin RJ11 connector and the 12 volt power pin 46. External power is supplied to the various connectors comprising the electrical interface panel 30 by a suitable 12 volt power source 49 which might comprise a dedicated 12 volt battery pack or, alternatively, an adapter configured to mate with a 12 volt automotive battery through, for example, a power plug or a cigarette lighter. External power source 49 is plugged into the 12 volt power pin 46 which takes the 12 volt potential from the pins' center post and distributes it to pin 1 of the 8-pin RJ11 connector 44 and the number 4 pin of each the 4-pin RJ11 connectors 38, 40 and 42.

The 12 volt potential is reference to a return or ground potential, by contacting a sleeve surrounding the center post in conventional fashion and the reference potential is directed to the number 8 pin of the 8-pin RJ11 connector 44 and the number 1 pin of the 4-pin RJ11 connectors 38, 40 and 42. In addition, a 12 volt supply is dropped across a series-configured resistor 50 and LED diode 48 combination such that the 48 emits when a power supply is present. Thus, a user is able to determine how the system is powered up by examining the LED 48 disposed in the recessed opening of the electrical interface junction panel.

In addition to power and ground, each of the 4-pin RJ11 connectors 38, 40 and 42 further comprise a 2-conductor serial signal path with pin number 3 of each of the connectors identified to a serial signal termed "CLK" and pin number 2 of each of the connectors identified to a serial signal termed "DATA". A first 4-pin RJ11 connector 38 is configured as a connector for supporting various pieces of auxiliary equipment and its serial signal lines are correspondingly each identified as "AUX". The CLK and DATA signals comprising pins 3 and 2 respectively are identified as AUX CLK and AUX DATA respectively. Likewise the next 4-pin RJ11 connector 40 is configured to provide serial CLK and DATA signals to the altitude motor assembly (alternatively a declination motor assembly) and its CLK and DATA signal lines are thus denoted ALT CLK (dec CLK) and ALT DATA (dec DATA), respectively. The next 4-pin RJ11 connector 42 is configured to provide serial CLK and DATA to the azimuth motor assembly (alternatively a right ascension motor assembly) and its CLK and DATA signals are denoted accordingly.

The interface junction panel 30 described in connection with the exemplary embodiments of FIGS. 3a and 3b is devised to be suitable for use in connection with the exemplary telescope embodiment of FIG. 2. Since the telescope embodiment of FIG. 1 does not require external connections to be made to its motor systems, the interface junction panel comprising the telescope system in FIG. 1 need not include the 4-pin RJ11 connectors which couple to the motor assemblies 32 and 34. Thus, the interface junction panel of the telescope system in FIG. 1 would include an 8-pin RJ11 connector for coupling to a command module 36 and 1 or more 4-pin RJ11 connectors for coupling to a plurality of auxiliary components through one or more "AUX" ports.

Thus, it will be understood that the electrical interface junction panel provides a means for routing power and control signals between and among an external power source, a control unit and various optional auxiliary pieces of equipment, such as electronic focusers, electronic leveling devices, a global positioning system receiver, and the like. So long as the auxiliary equipment is configured to communicate over a serial signal buff which supports clock and data signals.

In the context of the invention, both the telescope system embodiments of FIG. 1 and FIG. 2 are fully automated with distributed intelligence in that high-level user commands entered into the command unit 36 which in turn translates high-level user commands into appropriate commanded control signals suitable for action by the motors. Each motor is itself intelligent in that each motor is associated with a motor controller circuit which receives command and control signals from the command unit 36 and manipulates motor motion in response. Each of the motors are in turn, coupled to a motion feedback evaluation device, such as an optical encoder assembly, so that the actual travel of each respective telescope axis can be evaluated against commanded travel such that the position of each axis (and thus the telescope aspect) is determinable with particularity.

The intelligent motor controller is also responsible for slewing the motors at the proper slew rate by evaluating the speed of axial displacement and controlling motor speed correspondingly.

The aforementioned features of the fully automated intelligent telescope systems of FIGS. 1 and 2 are described in detail in co-pending patent application Ser. No. 09/428,866, entitled "Fully Automated Telescope System Distributed Intelligence," filed Oct. 26, 1999, and commonly owned by the assignee of the present invention, the entire disclosure of which is expressly incorporated herein by reference.

Figure 4:
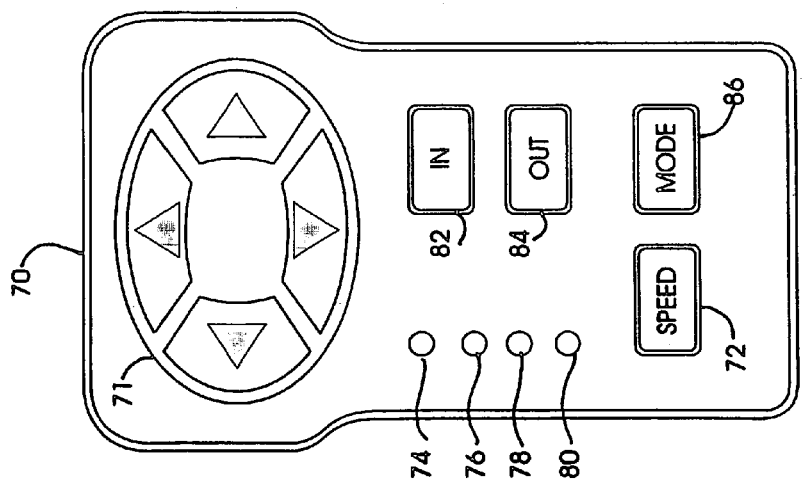
FIG. 4 is a semi-schematic front view of an embodiment of a semi-intelligent dual-axis drive motor motion control system according to practice of principles of the present invention.
Figure 5:
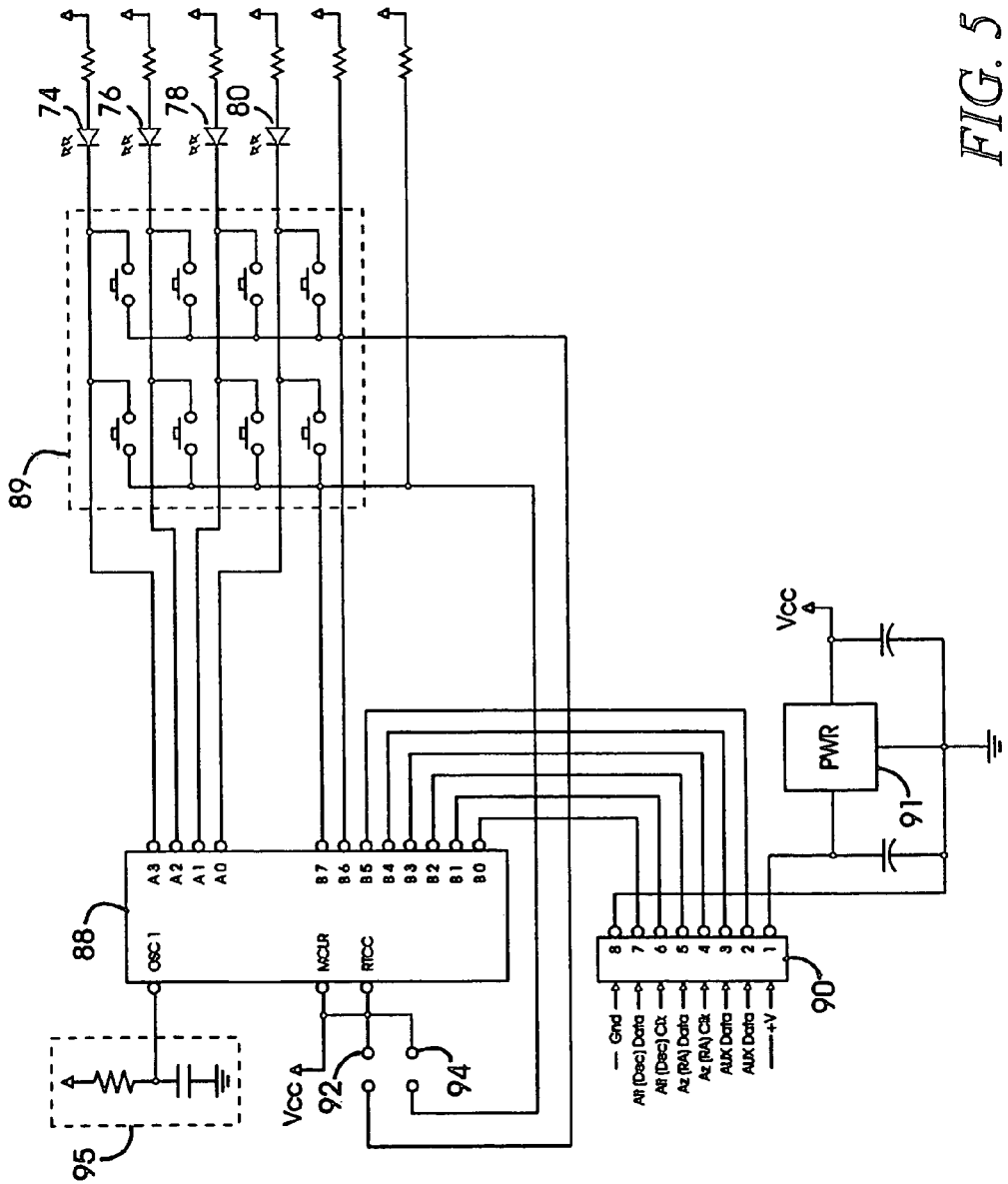
FIG. 5 is a semi-schematic block diagram of the electronic components of the embodiment of the semi-intelligent dual-axis drive motor motion control system of FIG. 4.

One particular embodiment of a hand-held control unit suitable for use in combination with an automated telescope system is depicted in FIGS. 4 and 5. FIG. 4 is a front view of the exterior portion of a semi-intelligent drive motor motion control unit 70 illustrating the various function keys that might be used by a user of a telescope system in order to command a telescope to move through various evolutions. The motor control unit 70 comprises a hand-held, self-contained, computer control unit, enclosed within a functional housing. The motion control unit is operational as a dual-axis motor drive corrector which enables telescope axis motor motion, from the very small tracking corrections necessary for long exposure astrophotography at sidereal rates, to the very fast slewing movements required for new object acquisition. The motion control unit supports motor movement commands from microslewing a telescope to, and for precision centering of a telescope onto, selected celestial objects. In addition, the motion control unit 70 is able to command certain special movement functions such as selecting various drive rates for the telescope motors, adjusting an optional electronic focuser, and the like. Further, and in accordance with the present invention, the motion control unit 70 is able to perform a variety of object acquisition and tracking functions which permits an automatic telescope system to automatically track desired celestial objects. As will be described in greater detail below, the motion control unit 70 contains sufficient processing power in order to be able to track objects with unusual celestial rates, such as the lunar rate.

The internal construction of the semi-intelligent drive motor motion control unit 70 is illustrated in the schematic diagram of FIG. 5. As can be seen, the operational heart of the motion 20 control unit 70 is an EPROM/ROM based 8-bit micro controller 88 exemplified by the PIC16C54, manufactured and sold by Microchip Technology, Inc. Function keys provide inputs to the micro controller 88, which, in response, develops control output signals which are directed to an 8-pin output header 90 having a pin configuration which corresponds to an 8-pin RJ11 connector (44 of FIG. 3b) of an electrical interface junction panel, to which the motion control unit 70 is intended to be connected.

In response to various direction, speed, focus and mode commands input to the micro controller 88, the micro controller develops and outputs control signals for the altitude motor, the azimuth motor and a control signal pair coupled to the auxiliary bus. Movement, speed, focus and mode commands are received by the micro controller 88 and appropriate output control signals are developed thereby in accordance with a software or firmware program hosted by the micro controller and conventionally stored in an internal memory space such as a programmable ROM memory.

In addition to receiving direction, speed, focus and mode commands, the micro controller 88 is adapted to differentiate between Northern and Southern hemisphere operations and between equatorial and Alt-Az tracking modes. Jumpers, or some other such signal delineator, differentiate between Northern and Southern hemisphere operations by their presence or absence, respectively. For example, Southern hemisphere operation might be defined by the presence of a jumper in a first jumper position 92 which completes an electrical short and asserts an I/O active state on identified inputs to the micro controller. For Northern hemisphere operations, the jumper might be absent from the first jumper position, thereby placing the appropriate input into an I/O inactive state.

Likewise, equatorial and Alt-Az operational modes might be differentiated by the presence or absence of a jumper in a second jumper position, respectively. Alt-Az mode might be defined by shorting the jumper position, thereby asserting an I/O active state, while equatorial mode might be indicated by an I/O inactive state.

With regard to communication between micro controller 88 of the control unit and the semi-intelligent motor assembly, commands are provided in serial fashion to the motor assembly in accordance with a packet communication protocol, wherein each command packet comprises one or more bytes of information with each information byte being sequentially clocked into the receiving micro controller, bit-by-bit, by a serial clock signal. In accordance with practice of principles of the invention, each motor assembly is directly coupled to the control unit's micro controller 88 via a 2-wire serial interface connection through the control unit's header 90 and, thence to appropriate I/O pins of the micro controller. Thus, information being communicated between a control unit and a motor assembly need not be preceded with header information. However, since the auxiliary serial interface is able to host a multiplicity of auxiliary apparatus, information being connected between a control unit's micro controller 88 and a particular piece of auxiliary apparatus, needs to be preceded by an address header in order to identify the information's intended recipient.

With regard to motor motion commands, these commands are issued directly to the motor assembly's micro controller over the corresponding 2-wire serial interface. Motor motion commands, more correctly termed step rate commands, are identified in hexadecimal as (00 h) and comprise three bytes of information. The step rate is defined as the number of steps or "ticks" that occur approximately every 6 milliseconds during motor operation. The format is a two's compliment number with the first number representing the whole steps or "ticks", the next two bytes representing the fractional portion thereof. Each step right command includes a sign (±) which determines the direction of motor motion.

A second step rate command, denoted (01 h) in hexadecimal is formatted substantially identically with the (00 h) command but is used for step rates greater than 2× the sidereal rate. Additional information communicated between the control unit micro controller and the motor assembly micro controller include a "change error count" command (02 h) which commands a one time change of the motor micro controller error count register.

Additional commands such as "turn on motor in positive direction" (06 h) and "turn on motor in negative direction" (07 h) are also provided by the control unit the motor assembly's micro controller. A "status" (08 h) command is read from the motor assembly's micro controller and is typically three bytes in length and further includes a flag bit. The first two bytes of information comprise the determined change in motor position since the last status read. The next byte comprises the PWM pulse count which is used to determine whether or not the motor is in a stall condition. The final bit, the flag bit, is an illegal encoder flag which indicates that an encoder "tick" was missed during the current motor position change. This bit is typically reset after a data read, as is the determined motor position information.

Those familiar with the internal construction and operational programming of a PIC 16C5X series micro controller, or any equivalent micro controller for that matter, will be able to routinely develop additional applications and command sets suitable for, for example, developing a digital clock, controlling a key pad, performing arithmetic calculations, and the like. All that is required in practice of principles of the invention, is that the control unit micro controller be able to communicate with one or more motor assemblies so as to command motor speed and direction changes which the motor assembly is able to execute. Further, the control unit micro controller is able to communicate with one or more motor assemblies so as to obtain feedback information as to the extent of motor motion, such that the control unit micro controller can calculate a telescope system's vector motion (direction and speed) with respect to the celestial sphere.

The control unit translates keypad information into motor motion commands, the motor assembly receives the motor motion commands and causes the required amount of telescope motion about its axes. Command and status information are communicated between the control unit and the motor assembly via a 2-wire serial interface in accordance with a packet communication protocol. The control unit is able to determine that its commands have been appropriately executed by evaluating return status information from the motor assembly. Appropriate telescope motion, in response to a motor movement command, is ensured by evaluating feedback signals developed by an optical encoder system mechanically coupled to the motor, electronically evaluated by the motor assembly's micro controller unit, and provided to the control unit as tracking computational input.

Each component coupled to the system comprises its own operational intelligence and requires only a serial command interface to a controlling entity to perform its designated functions. Since each component comprises sufficient intelligence (processing power) to execute its tasks without higher level supervision, the controlling entity is free to execute application programs, perform complex arithmetic calculations, maintain database entries, and the like.

Figure 6:
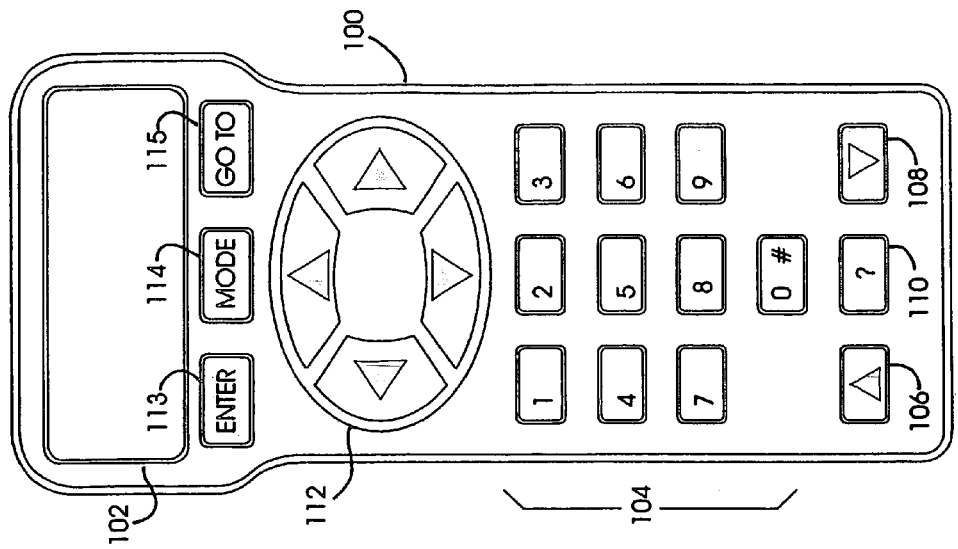
FIG. 6 is a semi-schematic front view of an intelligent dual-axis drive motor motion control system according to practice of principles of the present invention.
Figure 7:
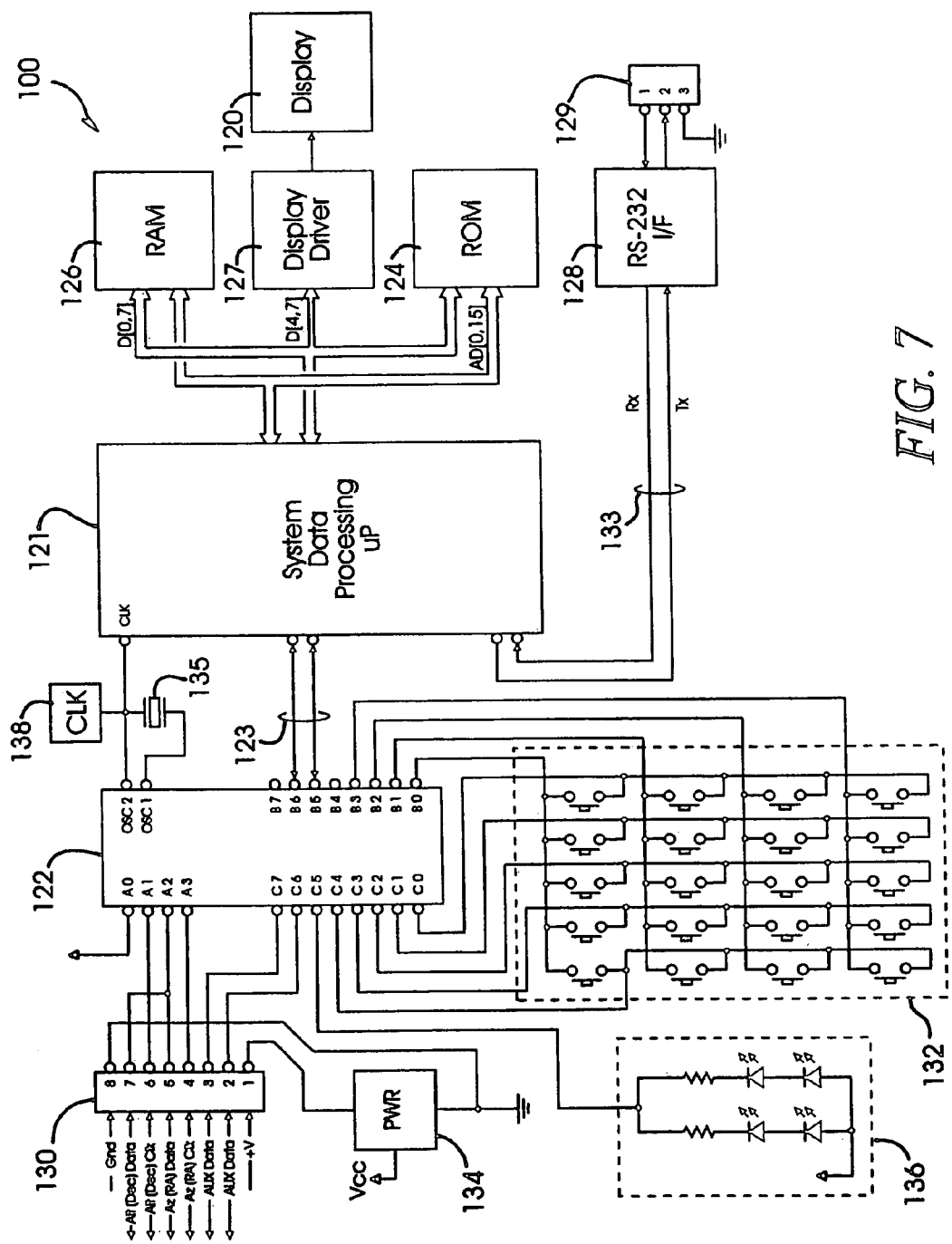
FIG. 7 is a semi-schematic block diagram of the electronic components of the embodiment of the intelligent dual-axis drive motor motion control system of FIG. 6.

An additional embodiment of the hand-held control unit suitable for intelligent control of a telescope system according to the invention, is illustrated in FIGS. 6 and 7. FIG. 6 depicts the exterior of an intelligent telescope system controller as it would appear to a system user, while FIG. 7 illustrates in semi-schematic block diagram form the configuration of the electronic components which provide functionality to the controller 100.

FIG. 6 is a front view of the exterior portion of an intelligent telescope system controller 100 illustrating the various function keys that are used by a user of the telescope system in order to command a telescope to move through various evolutions. The intelligent controller 100 comprises a hand-held package which functions as a full-spectrum control unit capable of intelligently defining and commanding motor movements required for astronomical observations, as well as for implementing their pre and post processing features in a manner similar to a micro computer.

The intelligent controller 100 suitably comprises an LCD display screen 102 capable of displaying text, numeric and graphic output data in a form that might be consulted by a user in operating the telescope system. All prompts, user queries, confirmation messages and the like are displayed on the LCD screen 102.

Telescope motion direction keys 112, labeled with directional arrows indicating up, down, right and left, provide the necessary inputs for enabling the telescope system to move or microslew in the specified direction at any one of a number of allowable, sentible speeds. As was described previously, the number of allowable speeds which can be commanded to the semi-intelligent motor assembly is limited only by the number of speed bits comprising the speed and direction command. In the particular embodiment being described, the number of allowable speeds that can be commanded to a semi-intelligent motor is 8, with one of the 8 allowable speeds being reserved for the motor stop command. Once the desired speed is selected, the desired motion direction key 112 is depressed and the system command the corresponding semi-intelligent motor to move the telescope system at the desired speed in the desired direction.

Scroll keys 106 and 108 are provided in order that a user can scroll through a database listing or through available menu options that might be shown on the LCD display screen 102. An enter key 113 selects a file menu option or function or is used to define the completion of an entry made in response to a system prompt. A mode key 114 allows the user to exit the current menu in order to return to a previous menu while a go-to key 115 commands the telescope system to slew the telescope to an object chosen from an internal celestial database listing.

The internal construction of intelligent telescope system controller 100 is illustrated in the semi-schematic block diagram of FIG. 7. As can be seen, the intelligent controller, indicated generally at 100, suitably comprises a dual processor system, with a dual processing function implemented with a first, general purpose micro processor 120 exemplified by the 68HC11, a member of the 68HCxx family of microprocessors manufactured and sold by Motorola Corporation, and a second purpose configured microprocessor or microcontroller 121 exemplified PIC16C57 microcontroller manufactured and sold by Microchip Technology, Inc.

The general purpose microprocessor 121 is coupled to a 16-bit address and data bus (AD[0,15]) and an 8-bit data bus (D[0,7]) which allows the microprocessor 121 to communicate with a programmable read-only memory (ROM) circuit 124 and random access memory (RAM) 126. Further, the 4 most significant bits of the data bus (D[47]) are coupled to the system's LCD display driver circuit 127 in order to provide an interface between the microprocessor 121 and the system's LCD display 120.

As will described in greater detail below, the microprocessor 121 is responsible for implementing the top-level firmware architecture of the system according to the invention and for executing suitable application software routines pertinent to the exemplary intelligent telescope system.

Programmable read-only memory circuit 124 is preferably implemented as a FLASH programmable ROM and is provided in order to host the instruction set for downloaded applications and software routines, data tables such as a stellar object position database, the Messier object catalog list, an earth-based latitude/longitude correspondence table and the like. Although described as an FPROM the ROM memory may be implemented as an EEPROM or any other type of programmable non-volatile memory element. Indeed the ROM 124 might be implemented as an external mass storage unit such as a hard drive, a programmable CD/ROM and the like. All that is required is that the memory 124 be able to be written to in order that its hosted databases and tables may be updated, and be non-volatile in order that its hosted databases and tables be available to the system upon boot-up or power-on-reset.

Microprocessor 121 is further coupled to the microcontroller 122 over a control bus 123 which, in turn, is coupled to the various function keys (indicated generally at 132) by a multiplicity of interface signal lines. In this respect the microcontroller 122 function as the system I/O and interface controller which translates use input taken from the keypad and provides command and control signal, derived from the user input, to the system microprocessor over the interface bus 123.

The system microprocessor 121 is further coupled to RS-232 interface port circuitry 128 over a serial bi-directional interface bus 133. The RS-232 port circuitry 128 is in turn coupled to an RS-232 interface connector 129, through which bi-directional communication between the microprocessor 121 and an external information source such as a personal computer (PC), a world wide web (WWW) interface link, and the like maybe effected.

Indeed the RS-232 port 128 may be configured to communicate with a similar RS-232 port comprising another separate intelligent controller system operating in conjunction with another separate telescope system. It will be understood that, when operating under appropriate I/O control application firmware the microprocessor 121 in connection with the RS-232 port 128 provides means for quickly and easily interfacing the system to an external source of program code, data or other information that a user might desire to incorporate into the instructions or data tables comprising the intelligent controller of the present invention.

Likewise, the microcontroller 122 is coupled to a bundled serial interface connector 130 suitably comprising an 8-pin RJ11 type interface suitable for connection to the 8-pin receptacle of the electrical interface panel of the telescope system. The interface connector is configured to support connections between the microcontroller 122 and 2 telescope axis drive motors, along with a plurality of auxiliary devices, over respective serial interface busses. So configured, the PIC16C57 microcontroller 122 will be understood as interfacing between the user I/O interface keys 132 and the 68HC11 microprocessor 121, to generate command and control signals suitable for use by a semi-intelligent motor and/or an auxiliary device, such as an electronic focusing system or GPS receiver operating in accordance with the NMEA interface standard, and provide such command and control signals to the electrical interface panel for routing to their appropriate destination.

In accordance with the present invention, the 68HC11 microprocessor 121 performs the high-level application execution tasks and the associated data handling and numerical processing, in order to define the appropriate motor motion commands to be provided to the PIC16C57 microcontroller 122. The microcontroller 122 receives motion command inputs from either the microprocessor 121 or the user interface keys and suitably processes the received motion commands into commanded control signals suitable for use by a motion control processor.

To complete the system and to give the microprocessor 121 some means of performing time calculations appropriate to celestial motion, a real time clock is provided and is coupled to a clock input of the microprocessor 121, as well as being coupled to the clock input of the microcontroller 122. The real time clock 138 is preferably implemented as a precision timing reference clock signal generator, such as a UTC clock that is used by the microprocessor 121 to calculate sidereal time intervals and preferable resides as an integral component of the control unit 100. Alternatively, the clock 138 might be implemented as a separate off-board integrated circuit comprising a conventional UTC clock which communicates with the system over the RS-232 interface or an on-board UTC clock and follow-on circuitry for converting UTC time intervals to sidereal time intervals prior to providing a timing reference to the microprocessor 121.

It should also be understood that a GPS receiver is able to provide timing signals which can function as precision timing reference signals in a manner similar to a UTC clock. Coupling a GPS receiver to the system according to the invention enables the control unit 100 to receive not only coordinated timing data but also user position data from a single external apparatus coupled to the system either through the auxiliary port or over the RS-232 interface.

Thus, it should be understood that the intelligent telescope system control unit 100 suitably comprises a means for adding full intelligence to a telescope system which includes semi-intelligent motors, in accordance with the present invention. The intelligent telescope system controller performs this function by bifurcating the system's processing and control functions into a first sub-system comprising a microprocessor operative for system data processing, and a second microcontroller system, for implementing I/O control. System intelligence is maintained up-to-date by allowing "new object" loadability through an RS-232 port. System software, updated celestial object catalog tables and the like, may be loaded into the system through the RS-232 port from a PC, an attached disk or disk drive, a website, a separate intelligent telescope system controller in accordance with the invention, and the like.

Beyond support of system utilities, the intelligent telescope system controller is also able to support a multiplicity of auxiliary devices that might be coupled to the telescope system in order to enhance its capabilities. Pertinent such devices include automatic focussing unit; a clock and date module, a speech recognition module along with an associated audio output module, an automatic alignment tool (tube leveler and/or axis planarizer), a global positioning system (GPS) module, a photometer, an autoguider, a reticule illuminator, a cartridge reader station (for courseware, the revisions, new languages, object libraries, data storage), and the like. Each auxiliary device is coupled to the system, in daisy-chain fashion, over the AUX DATA and AUX CLK signal lines comprising the auxiliary bus system or alternatively, over the RS-232 port.

The full spectrum of the auxiliary device command set can be easily implemented in the intelligent system controller because of the capability range of its microprocessor 121. It will be understood that the full spectrum command set may be incorporated in the microprocessor by a reasonably proficient programmer, making the intelligent system controller 100 capable of supporting the full spectrum of auxiliary devices. A reduced set of auxiliary device command sets are implemented in the semi-intelligent system controller (70 of FIGS. 4 and 5) because of the relatively limited capability of its microcontroller 88, with respect to the capabilities of the fully intelligent system. In deed the auxiliary interface bus provides a particular enabling feature for system upgrade capability, by virtue of its simplicity and the inherent expandability of its serial bus concept. Adding capability to the telescope system of the invention is as uncomplicated as merely coupling additional devices to the bus. The bus then provides the framework within which intelligence and capability are added, subtracted or modified on a piece-by-piece basis.

Each component coupled to the system comprises its own operational intelligence and requires only a command interface with a controlling entity in order to perform its designated function. Since each component comprises sufficient intelligence (processing power) to execute its tasks without higher supervision, the controlling entity is free to execute application programs, perform complex arithmetic calculations, maintain database entries, and the like without being unduly tasked by peripheral control functions.

In particular, the hand-held control unit performs high level application software execution tasks and associated data handling and numerical processing, in order to define appropriate motion commands which are to be provided to the telescope system's semi-intelligent motor modules. The motor modules suitably process the received motion commands into command and control signals suitable for operating the motors. In combination, the semi-intelligent motor controller and the hand-held control unit are able to execute a variety of telescope orientation and object tracking functions in a straight forward and inexpensive manner.

Primary control of an automated telescope system with distributed intelligence, in accordance with the present invention, is provided by a fully intelligent telescope system controller. Substantially all functions of an automated telescope system can be implemented through the keypad portion of the controller 100 by depressing the various alpha, numeric and function keys provided thereon. Once the automated telescope system has been appropriated aligned, as will be described in greater detail below, an object menu library, stored in a dedicated memory space provided in the controller, is used to automatically slew the telescope system to any particular celestial (or terrestrial) object an observer desires to view or photograph.

Figure 8:
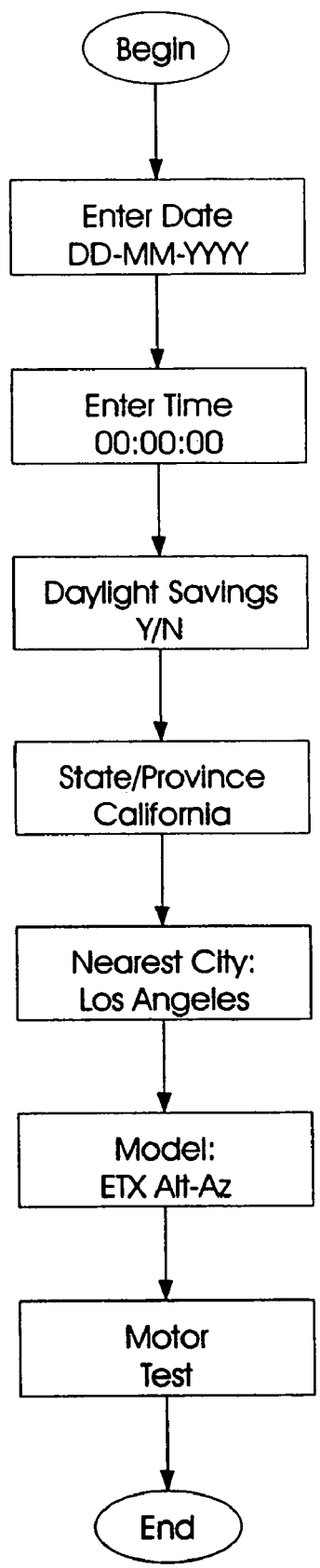
FIG. 8 is a conceptual flow diagram of an initialization procedure in accordance with the invention.

However, prior to beginning an observation and indeed during initial set-up of the system, the user must first initialize the system entering certain information in accordance with an initialization or set-up procedure which can best be understood with reference to the initialization procedure flow chart of FIG. 8.

After each of the individual components comprising the system are connected together, the intelligent controller 100 is plugged into the control unit port and power is provided to the system. Following "power-on-reset", the system controller prompts the user to enter the current date, by entering the appropriate figures in formatted date field. An exemplary date field might appear as "Jan. 1, 2001", numeric values such as the date and year are entered by depressing the corresponding numeric keys of the numeric keypad when prompted to do so by the system. The current month is entered by scrolling through a list of months using the up and down arrow keys provided for that purpose. In particular, the date cursor automatically jumps to the next space once particular numeric value is entered. If a mistake is made during entry, the right or left directional keys may be depressed to move the cursor backward or forward until it is positioned over the incorrect entry. The correct entry may then be made by depressing the appropriate numeric key on the numeric keypad 104.

After all of the date information has been correctly entered, the system prompts the user to enter the current time. It should be noted that the system is operative in a 24-hour mode and therefore time should be entered using a 24-hour clock (i.e. 9:00 p.m. is entered as 21:00). This procedure is very useful in enhancing the precision of positioning calculations undertaken by the system by giving the system a more precise indication of the correct time. Needless to say, the more precise the time indication provided to the system, the better the system will be able to locate objects on the basis of their published right ascensions and the better the system will be able to accurately position the telescope to view them.

At this point, the positioning keys 112 of system controller 100 are activated such that they can be used to move the telescope. The user is able to either immediately proceed using the telescope without further initialization data entry or a user may continue with data entry in order to enable additional features of the inventive system. If a user chooses to continue with initialization, a next procedure displays the status of a daylight savings time feature. Daylight savings time is in effect from the first Sunday in April through the last Sunday in October in most areas of the United States and Canada. Users are cautioned to investigate whether their geographic local time conforms to daylight savings time or not.

A next sequence of data entry operations enables a particularly novel orientation feature in the present invention wherein an observers latitude and longitude are approximated by the latitude and longitude of the closest city of geographical land mark which a user may designate as reasonably approximating the observation location. For example, the next procedural step causes the LCD display to request entry of the nation, state or province of the user's primary observation site. The scroll keys are used to scroll through a list of various countries, states and provinces contained in the system's database until the observer's nation, state or province appears on the screen.

Following selection of the observer's nation, state or province, the observer is requested to select the closest city or major geographical feature to their primary observation location by using the scroll keys to cycle through an alphabetical list of cities and geographical features. When the desired city or feature is displayed on the screen, the user depresses the enter key in order to inform the system that the virtual location procedure has been concluded. The geographical coordinates (latitude and longitude) of the select site are then entered into system memory as a first approximation observation location indicia which is used in combination with the current time in order to orient and align the telescope system for fully automated use.

Figure 9:
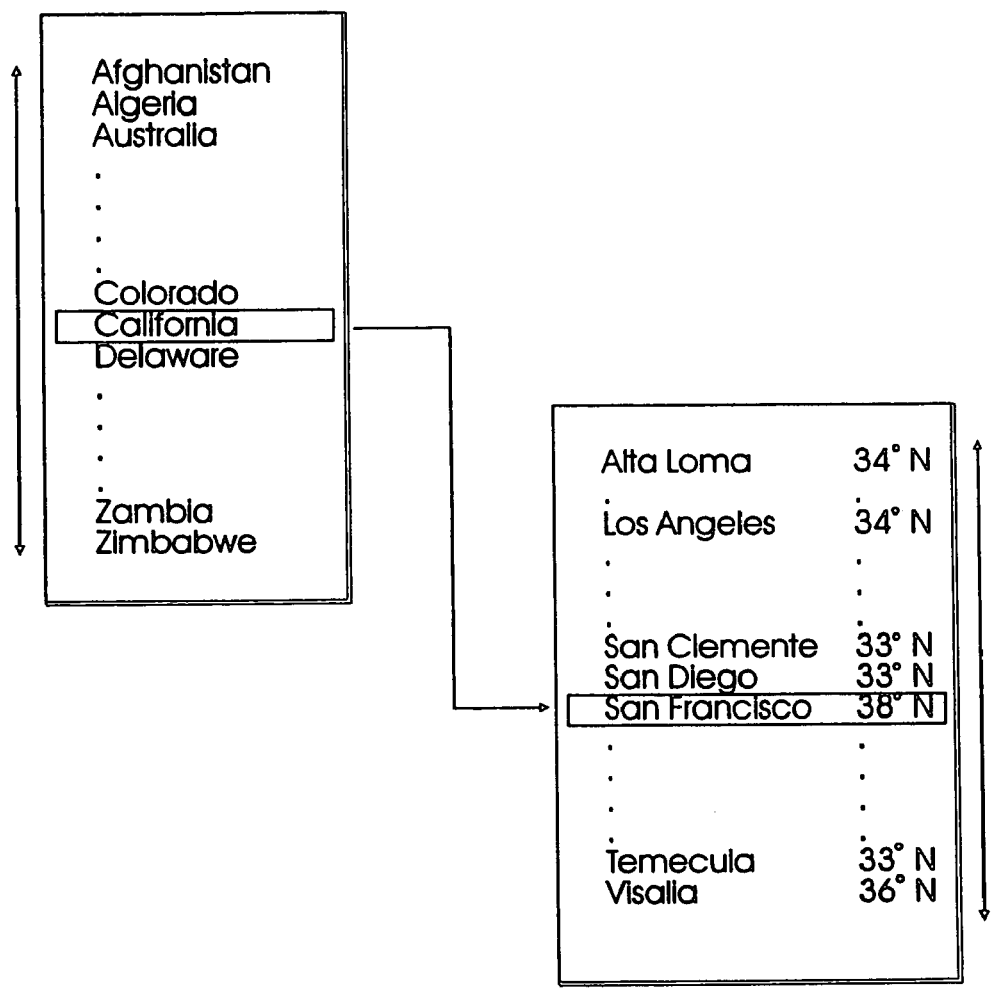
FIG. 9 is a database table illustrating an exemplary location entry.

This virtual location procedure is enabled by a database table comprising a multiplicity of alphabetically listed geographic locations with each location associated to their known latitude and longitude coordinates, as depicted in FIG. 9. FIG. 9 illustrates a partial database listing of an exemplary-level location table and a sub-level database listing for locations contained within the indicated California entry. The location database listing is typically stored in the system's ROM memory, but might alternatively be stored in an external disk drive, a floppy diskette or some other such mass storage device. So long as the location database listing is stored in some non-volatile memory such that it may be accessed at need upon system power-up. Such a virtual location procedure will be considered advantageous, particularly when one considers that the location of a particular celestial object in the night sky, at any given time, is solely a function of the observer's latitude and the observer's local hour angle displacement from the celestial meridian, in turn a function of the observer's longitude and the observer's local time-of-day (also known as local hour angle). Thus, once an observer's latitude and longitude are known, as well as the time-of-day (expressed in universal time coordinates), the observer has all the information necessary to compute the relative bearing, in either altitude and azimuth or declination and right ascension of any celestial object whose absolute coordinates are known. When an observer enters a reasonable approximation of his latitude and longitude, and enters his local time, the system is able to reasonably approximate the orientation of the night sky with respect to that observer. As will be described in greater detail below, further corrections may be made to this "first approximation" orientation procedure in order more precisely and accurately define the night sky with respect to the telescope's orientation.

Alternatively, the entire initialization procedure described in connection with the exemplary flow diagram of FIG. 8 may dispensed with by the simple expedient of coupling a global positioning system (GPS) receiver to either the auxiliary port or the RS-232 port of the telescope system and using the data provided by the GPS receiver in place of manual data entry. GPS receivers are manufactured by a variety of commercial venders and are available to the general public in small units costing as little as $100.00. GPS receivers are able to provide latitude and longitude information, as well as coordinated timing information, over a signal bus in accordance with a generally accepted communication standard, such as NMEA. In this manner, date and time information as well as the observers latitude and longitude are made available to the system in electronic form over a simple electronic interface. Even a daylight saving time indication may be dispensed with since the system is able to evaluate the latitude and longitude information provided by the GPS receiver and determine whether the user is in the United States or Canada during the requisite time period at which daylight savings time is operative. Thus, coupling a GPS receiver to the system further simplifies the system's initialization procedure, making systems of this type easily accessible to persons with no prior knowledge of astronomical observation techniques.

There are two fundamental considerations that must be given to any fully automated telescope system in order for that system to be useful to the observer. The first is that the telescope (particularly a telescope configured as an altitude/azimuth telescope) must be able to operate in accordance with the celestial coordinate system expressed in right ascension and declination coordinates (understand the congruence of rectangular coordinates with spherical coordinates). Secondly, once a particular object, expressed in celestial coordinates, has been acquired the system must be able to track that object's motion through the sky. Therefore the processing power of the intelligent telescope system in accordance with the invention, is directed toward implementing these two fundamental operations: objection acquisition and object tracking. The first operation is enabled by orienting the telescope system with the night sky.

One particular embodiment of an orientation or alignment methodology in accordance with the practice of the invention, is described in connection with the procedural flow chart of FIG. 10. Specifically, when the alignment procedure is selected from a prompt screen, the system prompts the user to move the telescope (using motion keys 112) until the telescope is pointed in the direction of north. It should be mentioned that the telescope could also prompt the user to move the telescope until it is pointed in the direction of south, if the user is in the southern hemisphere and south is the more appropriate direction. After the telescope tube is pointed toward the north, a user depresses a function key in order to inform the system that the telescope tube is in its appropriate position. Next, the system prompts the user to level the telescope tube by adjusting the telescope's altitude position until it is pointed towards the horizon. Pointing the telescope in a particular compass direction such as north and leveling the telescope tube, functions to zero-in the position encoders of the altitude and azimuth motor assemblies. Any subsequent motion of the telescope away from its zero, zero position allows the telescope system to directly calculate its altitude and azimuth displacements from the zero, zero reference point.

Using the time and date entries either input by the user or acquired from a GPS receiver, the telescope system consults a data base of well-known celestial objects and selects a particular bright object which is currently above the horizon. The time and date information allows the system to calculate whether that particular bright object has rotated sufficiently in right ascension to bring it above the observer's horizon, while the latitude and longitude entry, either provided by an observer or acquired from a GPS receiver, provides the system with sufficient information regarding an observer's latitude such that it may calculate an approximate declination value for that bright object.

Once an object (such as a star) is identified in the data base, the system automatically slews the telescope to the vicinity of that star by commanding the appropriate motion from the altitude and azimuth motors. Once the telescope has slewed to the vicinity of the desired star, the observer is prompted to center the star in the field of view of the telescope eyepiece. When the star is centered, the observer depresses a function key and the system then searches the data base for a second bright object or star which is displaced at least 30° from the previous star in order to increase the accuracy of the orientation or alignment procedure. Once the second star is identified from the data base, the system automatically slews the telescope to the vicinity of that star and once again prompts the user to center that star in the field of view of the eyepiece. When the second star is centered, the system calculates the position and orientation of the telescope with respect to the night sky (the celestial sphere).

Figures 10, 11:
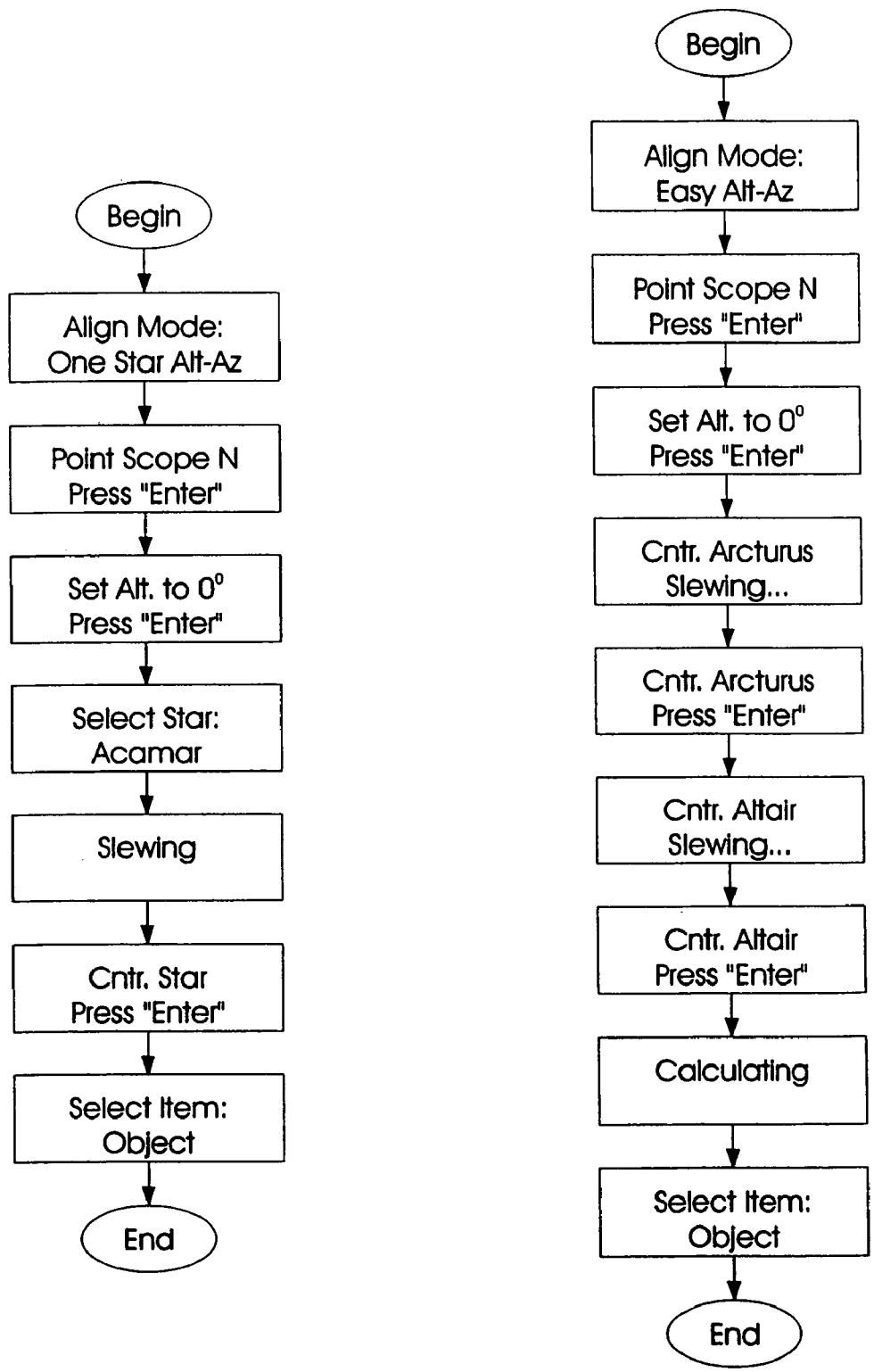
FIG. 10 is a conceptual flow diagram of a first, "easy" Alt-Az alignment and orientation procedure in accord with the invention.
FIG. 11 is a conceptual flow diagram of a second, single star, Alt-Az alignment and orientation procedure in accord with the invention.
Figure 12:
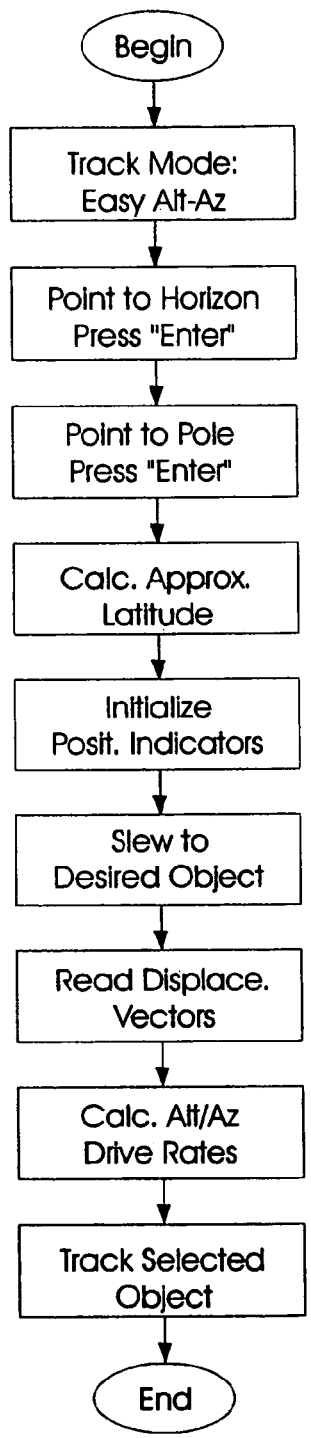
FIG. 12 is a conceptual flow diagram of a first alignment and tracking procedure in accord with the invention.
Figure 13:
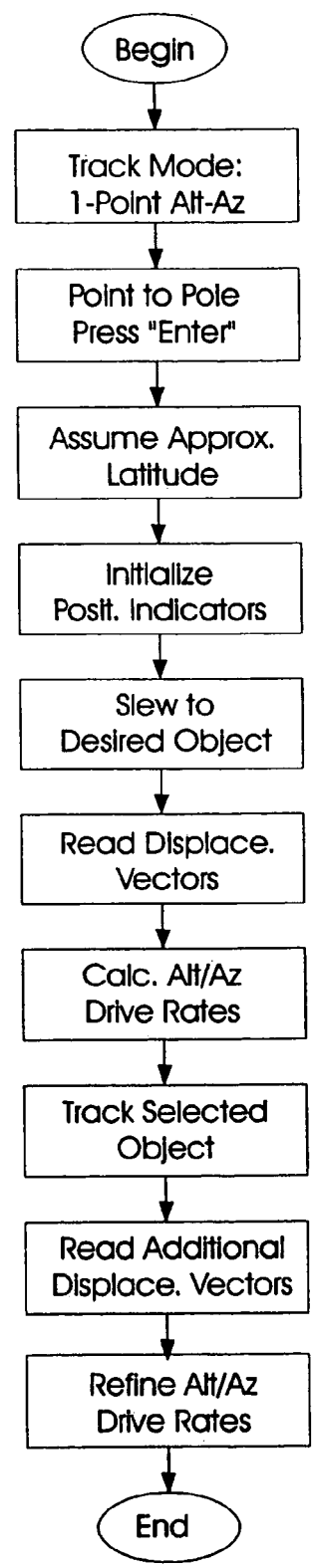
FIG. 13 is a conceptual flow diagram of a second alignment and tracking procedure in accord with the invention.

A further, truncated, alignment and orientation procedure is depicted in the exemplary flow diagram of FIG. 11, in which an Alt-Az configured telescope is oriented to the night sky using only a single star alignment procedure. As with the previous case, a user is prompted to zero-in the motor position encoders by pointing the telescope toward the north (or south) and leveling the telescope by pointing the tube at the horizon. The user then selects a particular star from an alphabetized stellar object data base list and presses a function key which causes the telescope to automatically slew to the vicinity of that star. The user centers the star in the field of view of the eyepiece by depressing the position keys 112 as required. Once the chosen star is centered in the field of view of the eyepiece, the user again depresses a function key and the telescope is aligned for a night of viewing.

The telescope is technically considered "aligned" or "oriented" after the user follows the above-described alignment procedure. However, the accuracy of a single star telescope alignment procedure should only be considered sufficient for general astronomical observations. Because of certain pointing errors that occur as the result of well-known astronomical perturbations, additional observations from the basis for third, fourth, fifth and higher order refinements to the accuracy of the alignment or orientation procedure.

Once the absolute position of the telescope system with respect to the night sky is determined, the system microprocessor 112 is easily able to calculate the path of any given celestial object through the sky, and to develop the appropriate motor motion commands, in accordance with well-known drive rate equations to be described in greater detail below, such that an Alt-Az telescope system can smoothly and accurately track the object, i.e., "stop the sky" in software. A celestial object's motion through the sky will, necessarily, be calculated in terms of its rate of change in both altitude and azimuth as a function of time. Thus, for a given period of time, the system microprocessor 121 is able to calculate the incremental motor motion or "tick" rates required to be executed by the motor so as to allow the telescope to attract the object as it moves through the sky.

With regard to the foregoing alignment procedures described in connection with the orientation flow charts of FIGS. 10 and 11, it should be noted that the system controller calculates the telescope's position by mapping the telescope's Alt-Az coordinate system (Cartesian coordinate system) to the RA and Dec spherical coordinate system defining the night sky (celestial sphere). In particular, the system controller reads the telescope's altitude and azimuth angular positions, when pointed at the selected star or stars, by reading the altitude and azimuth motor position encoder values after each star has been centered in the telescope eyepiece. From the telescope pointing angles thus defined, the system controller calculates the telescope's Cartesian position vectors and resolves each position vector into a matrix of direction cosines. The Cartesian coordinate matrix is mapped into a similarly defined matrix of the direction cosines of the star or stars expressed in terms of the spherical coordinate system, using well understood mathematical techniques involving matrix manipulation and rotation. The matrix of celestial direction cosines is generated by evaluating the RA and Dec coordinates of the star or stars identified by the user during the selection procedures. It will be evident to those familiar with mathematical arts that once the same two points are identified in two different coordinate systems, those two coordinate systems can be mathematically mapped to one another such that any further coordinates expressed in one coordinate system are easily expressed in the other coordinate system through a mathematical transform. Thus, once the telescope system is aligned with respect to the celestial sphere, further observations may be made by merely expressing the location of the desired object in terms of its celestial coordinates. The system controller understands the relationship between the celestial coordinate system and the telescope's altitude and azimuth coordinates, makes the proper mathematical transformation, and drives the altitude and azimuth motors appropriately in order to point the telescope at the desired celestial position.

Notwithstanding the alignment and orientation procedures described above, the fully automated telescope system in accordance with the invention is able to implement object tracking procedures without regard to formal alignment and orientation. Specifically, the intelligent telescope system is able to track any selected celestial object having recourse only to a good approximation of an observer's latitude. It is a well understood concept that a celestial object's motion through the sky will be a function of an observer's latitude and, once an objection's initial motion vector is defined, that object's radial travel path can be calculated. Once the travel path has been calculated, that object may be "tracked" throughout its motion across the night sky.

The solution to any given problem in celestial trigonometry depends on being able to convert measurements obtained in one coordinate system (Alt-Az, for example) into the other coordinate system (the celestial coordinate system for example). Coordinate system transformations are well understood by those having skill in the art, indeed, have also undergone a conceptual evolution, culminating in modern day, computer assisted, matrix transformation and rotation mathematics. Nevertheless, regardless of the coordinate systems used to express an observation and the coordinate system used to define a universal reference, observations made in one coordinate system may be rotated into the reference coordinate system using simple mathematical principles, so long as two points in one coordinate system correspond to the same two points in the other coordinate system, such that transformation boundaries with respect displacement and rotation are defined. Thus, two reference points expressed in an Alt-Az coordinate system, for example, are a necessary and sufficient condition for the Alt-Az coordinate system to be rotated into a celestial coordinate system, so long as those same two measurement points have a corresponding location metric in the celestial coordinate system. Tracking an object is conceptually a rather simpler exercise, and involves "stopping the sky" in software by driving the telescope axes in accordance with the following equations:

$$\frac{dZ}{dh} = 15 \sin A \cos \phi \qquad \text{EQUATION 1}$$

$$\frac{dA}{dh} = -15(\sin \phi + \cot Z \cos A \cos \phi) \qquad \text{EQUATION 2}$$

where Z is the calculated zenith distance of an observer, h is the observer's local hour angle (or LHA), A is azimuth (measured westward from south) and Φ is the observer's latitude. The rate of change of an object's zenith distance Z with hour angle h and the rate of change of an object's azimuth A with respect to hour angle h is defined in units of (sidereal second)$^{-1}$. Thus, in order for the telescope system to be able to adequately acquire and track a given celestial object a first condition is that the telescope system understand its orientation with respect to the sky such that an observer's latitude and local hour angle (Φ, h) can be calculated.

Additionally, and in accordance with the invention, if an observer's latitude and azimuth (Φ, A) are known, an objects zenith distance Z and respective motion (dh) can be first approximated, and then calculated, by iterative solutions of the drive rate equations. Since an objects proper motion, with respect to the celestial hemisphere, depends on the latitude of an observer, once an observer's latitude is defined, or approximated, an automated telescope system is able to reasonably approximate, and therefore track, any object whose zenith distance Z and azimuth A is determinable.

In a first tracking procedure, a user need only indicate to the telescope system, through use of a hand-held control unit (referred to hereafter as a hand box controller) which hemisphere (Northern or Southern) the observer is in. The observer next commands the telescope system to manually move such that the optical system is pointed in the direction of the corresponding celestial pole (the pole star or Polaris in the Northern hemisphere). This particular position is indicated as a starting point for the tracking procedure, by signaling the hand box controller with a set of pushbutton or key pad requests. Next, the telescope system is lowered to a level position such that the telescope optics are directed at an observer's local horizon. The hand box controller is again signaled with a set of push button or key pad requests indicating that this position is a second reference point for the procedure.

Pointing the telescope optics first, towards the North celestial pole, and the next at the horizon, sets two reference points in the memory of the hand box controller unit. Slewing the telescope system from the North celestial pole to the horizon defines the angular displacement of the North celestial pole above the horizon, which angular displacement corresponds to the observer's latitude. Initializing the telescope system to an observer's horizon will then allow the telescope system to capture an object's zenith distance Z by a simple trigonometric subtractive calculation.

Initializing the telescope system to the North celestial pole further provides a zero reference point for azimuth A calculations. Thus, it will be understood that initializing the telescope system with respect to the North celestial pole and an observer's horizon, provides all the requisite data necessary for an instantaneous solution of the drive rate equations given above. The hand box controller now has all of the information needed to track any celestial object placed in the field of view of the telescope system.

A simplified alignment and tracking procedure is patterned along the lines of the preceding alignment system. As with the previous case, a user indicates to the hand box controller which celestial pole will be used for the procedure (i.e. whether the observer is in the Northern or Southern hemisphere). The telescope is slewed to a level position, pointing in the direction of the pole (level and North or level and South) and the hand box controller is signaled with a set of push button or keypad requests. Signaling this information into the hand box controller has the effect of initializing the azimuth A and altitude (Z or 90-Z) motor positions such that altitude and zenith distance of an object are easily determinable. Latitude need not be affirmatively calculated, so long as the system has some means of determining an objectively reasonable, and reasonably accurate, observation latitude.

In accordance with the principals of the present invention, the hand box controller assumes that the telescope system is positioned at a particular latitude of high probability, chosen by a statistical analysis of world population distribution on a hemisphere by hemisphere basis. In particular, in the Northern hemisphere, latitude 38° N offers a very high probability of being close to an observer's actual latitude. Accordingly, 38° N is chosen as the first approximation of a latitude metric and used, initially, in the drive rate equations. Since the latitude metric is an approximation, object tracking might not be perfect, but even though an approximation, the system will considerably lengthen the time an object remains visible in the field of view of the telescope eyepiece.

A further tracking procedure can be implemented by the automated telescope system according to the invention that can function as a stand-alone tracking system, or as an iterative correction methodology that can be applied to either of the two previously described tracking procedures in order to refine the variable data for the drive rate equations and so improve system tracking. Although the telescope system might technically be considered "aligned" after the user follows any of the above-described alignment procedures, telescope tracking accuracy should only be considered sufficient for general astronomical observations. Because of certain pointing errors that occur as the result of well known astronomical perturbations, additional observations might be incorporated into the procedure to refine the accuracy of the initialization procedure.

In particular, if a telescope is pointed at a particular celestial object, or any object moving at a reasonably steady rate in a definable direction, like an airplane, satellite, boat or flock of geese, the telescope may be manually repositioned in order to keep the objects centered in the eyepiece field of view. In this particular circumstance, the hand box controller records the movements commanded to the motors and uses the average corrections to the motor motion commands to define a motion vector (angle and speed) to create a continuous tracking motion. The telescope then automatically tracks the selected object after a sufficient number of altitude and azimuth commands have been received, to calculate an average motion. Even when in automatic tracking mode, additional corrections to the telescope position will continue to update the average motion calculation and thus allow the telescope system to more accurately track the object.

When used in combination with the simplified coarse alignment procedure, above, minor corrections to the telescope system's tracking motion are plugged-in to the drive rate equation results and new, more precise values of an observer's latitude may be calculated. In addition, further observations and tracking corrections provide additional data points which are incorporated into correction algorithms that compensate for pointing errors that occur as the result of well known astronomical perturbations. As additional observations and corrections are made, the system is able to compensate for precession, refraction, as well as certain mechanical errors introduced by imperfections in the telescope mount, the motor and drive train system, the servo feedback system and imprecisions in leveling the telescope.

In this regard, the first and second alignment procedures might be viewed as creating a base speed and base direction which might be used as an initial vector in the third procedure. This permits method three corrections to be smaller and further permits tracking to start immediately upon selection of an object by a user.

The system hand box controller receives user I/O information, and performs any needed data processing under application software program control. Data processing typically results in some form of desired telescope motion with the system being able to calculate the direction and extent of the required motor motion and being further able to direct the appropriate motor assembly to take the required action by passing the appropriate command.

Notwithstanding the foregoing discussion of telescope orientation and alignment, it will be evident to one having skill in the art, that major simplifications can be made to a telescope orientation and alignment procedure by incorporating additional component devices that are able to automatically provide an indication of the orientation of the telescope tube with respect to the compass, i.e., North-South sensing, and an automatic indication of axial tilt, i.e., telescope level. Given such ancillary devices, an automated telescope system might be able to instantaneously understand its orientation to and alignment with a celestial coordinate system, given only an indication of an observer's latitude. The observer's latitude can be determined either directly by pointing the telescope system at a respective celestial pole, or indirectly by following the proper motion of a known celestial object and computing latitude from the drive rate equations.

Pertinent such additional component devices include an MR sensor system, such as described in co-pending patent application Ser. No. 09/428,866, entitled, "Fully Automated Telescope System With Distributed Intelligence," filed Oct. 26, 1999, commonly owned by the assignee of the present invention, the entire disclosure of which is expressly incorporated herein by reference. Such an MR sensor is able to electrically resolve a position orientation using the earth's magnetic field, to an accuracy of approximately 0.5° and with a resolution of approximately 0.1°. As is well understood by those having skill in the art, the earth is surrounded by a magnetic field which has an intensity of from approximately 0.5 to approximately 0.6 Gauss and includes a component parallel to the earth's surface that always points towards magnetic north. This feature of the earth's magnetic field forms the basis for all magnetic compasses and it is the components of this field, parallel to the earth's surface, which are used to determine compass direction. Telescope level orientation is accommodated by use of a level sensor, which may be provided separately or which may be incorporated within the MR sensor. The telescope system is thereby provided with a fully automated, electronic methodology for 3-axis sensing. This allows the telescope system to automatically adjust itself to a level condition, as well as automatically adjust itself to align with either a true or a magnetic north. Once these alignments are made, the axis encoders of the motor systems are automatically initialized in order to compensate for mount alignment parameters. Therefore, electronic sensors coupled to the telescope tube provide a very repeatable position index when in proximity with the mount's axis crossings.

Further, accurate location information can be provided to the intelligent system control unit by use of the global positioning system (GPS) or differential global positioning system (DGPS) receiver configured with an NMEA interface. The NMEA interface is a well recognized interface protocol which can additionally be coupled to the auxiliary interface or RS-232 port to provide a source of location information directly to the intelligent system control unit. Once the intelligent system control unit has location, time and date information available, as well as axial aspect information derived from the "north" and "level" sensors, the intelligent system control unit becomes fully aware, not only of its location, but also of the spatial orientation of the telescope system to which it is coupled.

A further refinement to these orientation and alignment systems can be made by understanding that a celestial object follows a predetermined path in the night sky, which path may be described by a relatively simple mathematical relation. Once an observer's latitude is known, any celestial object, having a known position RA and Dec, can be used to define an observer's longitude (or local hour angle, or the like) by evaluating the objects actual track through the night sky and solving its equation of proper motion. The object's position on the proper motion curve is necessarily a function of the observer's longitude. This derived information can be incorporated with tracking measurements in order to further refine a telescope system's alignment and orientation data.

The foregoing procedure might be referred to as telescope alignment on the basis of "drift alignment" of a particular celestial object. Drift alignment refers to the monitoring of the movement of any particular star and understanding the orientation of the observation system based on the direction of movement and magnitude of movement of the particular celestial object. Deriving movement vectors, i.e. identifying direction and magnitude of movement, can be performed manually by an observer's following the motion of a celestial object with a telescope system. Celestial object movement is signaled to the telescope's control system by moving the control system using the slew keys of the hand box controller in order to maintain the object in a relatively centered position in the telescope eyepiece.

Figure 14:
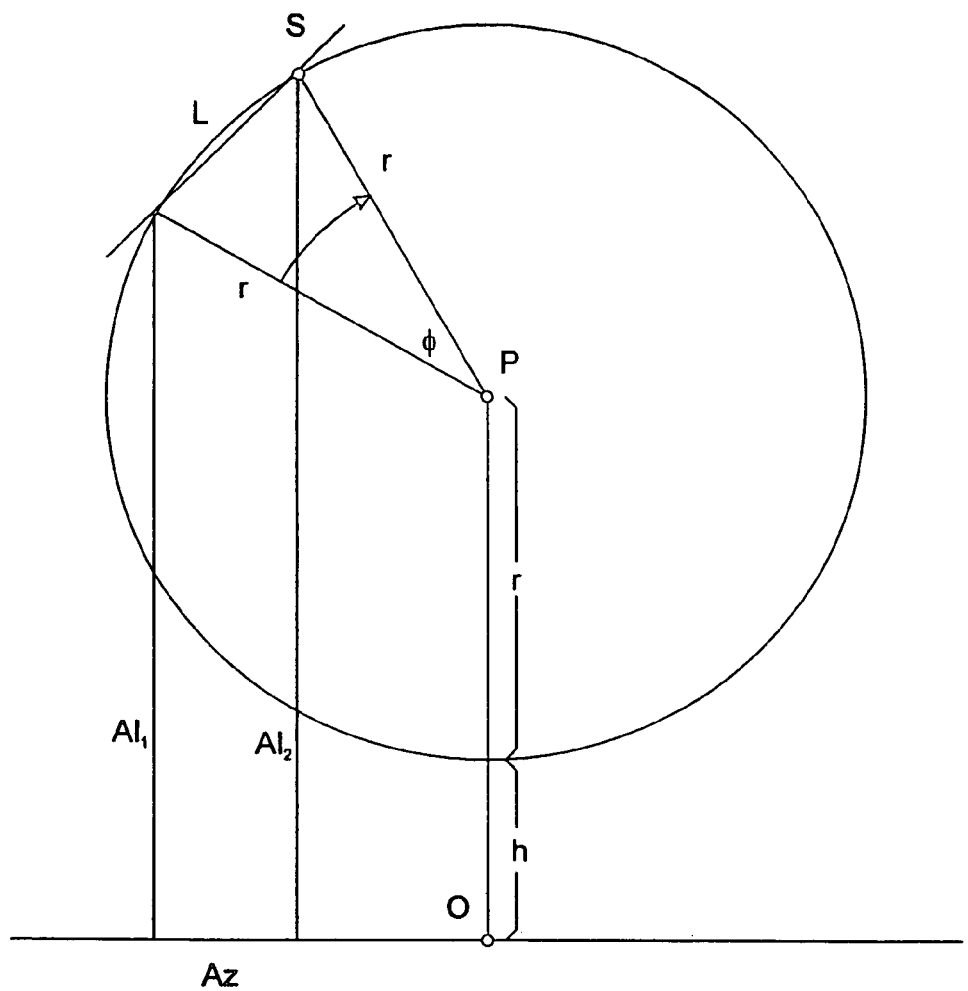
FIG. 14 is a semi-schematic illustration of the proper motion of a celestial object moving in accordance with a sidereal rate.

Particularly, and in connection with the illustration of FIG. 14, it is well settled that a celestial object's apparent motion defines a circular path about a centroid defining a celestial pole and closely approximated by Polaris or the "Southern Cross", for example. An observer O who is tracking a celestial object, such as a star S, will move the telescope through an arc at a particular rate (the sidereal rate), thereby defining an arc length L. If the telescope is configured as an Alt-Az, the arc will necessarily be approximated by small linear displacements in altitude and azimuth. The root of the sums of the squares of the displacement values will then define a hypotenuse of an isosceles triangle, the other two arms of which each define the radius r of the object's circular path about the celestial pole. The hypotenuse, so defined, is a very-close approximation to the arc length L moved through by the object. Knowing the sidereal rate and the time taken between measurements allows the system to calculate the angle $\Phi$ which subtends the arc. Given this information, the system determines the radius r through the relation: $ArcL = r\Phi$. Knowing r, the sidereal rate, and an object's instantaneous position, the system has all the information necessary to derive and solve that object's equations of motion, such that tracking becomes fully automated. Minor corrections made by a user to maintain an object in precisely the center of the viewing area function to also refine the equations of motion, such that tracking accuracy can be enhanced to any required degree.

Further, if the telescope system had been previously referenced to the horizon, the altitude data, $A1_1$ and $A1_2$, taken at two viewing positions of an object can be used to define the observer's latitude, in background, by merely tracking an object for a small period of time. Performing the above-described tracking procedure defines an object's radial distance r from a corresponding pole. Using well understood trigonometric principles, the height h of the radial distance r is calculated and the algebraic sum (h+r) describes the declination of the corresponding celestial pole. Given this, an observer need only slew to another arbitrarily selected celestial object and the telescope, knowing only the object's declination, will begin automatically tracking the object.

To complete the development, it will be further understood that if the object is know, i.e., if its celestial coordinates are identified to the system, the system has all of the information necessary for total alignment and orientation of the telescope. Evaluating two positions of a known object within a known time interval, with the system according to the invention, corresponds to evaluating two different known objects (the two object methodology discussed above).

Figure 15:
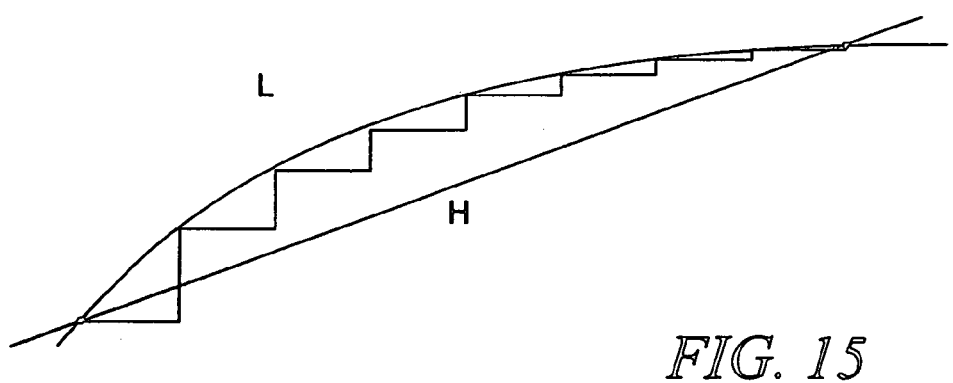
FIG. 15 is a semi-schematic illustration of a curvilinear travel path of an object illustrating changes in altitude and azimuth.

Turning now to FIG. 15, an object whose apparent motion with respect to the telescope, describes an arcuate path A is tracked by the telescope system by adjusting the telescope's altitude and azimuth. For each adjustment required to maintain the object substantially in the center of the viewing area, there will be a corresponding change in altitude, a change in azimuth, or both. If the object is traveling at a constant speed, the system is able to define a rate of change of altitude as well as a rate of change of azimuth and drive the axial motors accordingly. As an object's arcuate travel path changes from a generally upward direction to a generally downward direction, it will be understood that the "change in altitude" parameter will change sign (i.e., move through an inflection point). This allows the system to develop a prediction of an object's travel path even if the travel path is relatively complex.

Alternatively, deriving an object's movement vector might be performed automatically if the telescope system is coupled to an electronic imager which, in turn, supplies movement magnitude and direction information to the hand box controller. An electronic imaging system might be configured so as to place a particular celestial object within a target reticle of the imager and be instructed to maintain the target star within the target area. Thus, movement vectors can be derived from the direction and magnitude of telescope motion required to maintain the target star within the target reticle of an electronic imager.

Thus, the relative movement relationship of the celestial coordinate system with respect to the telescope coordinate system can be determined on the basis of a single star and the dynamic movement direction and magnitude required by the telescope system in order to track that star. It should be noted, that a relative motion basis is determined using a single star sighting. A second, separate, star might be acquired and used in the same manner in order to obtain additional precision for overall alignment.

It should be noted that in the above-discussed drift alignment methodology, there is no need to be concerned about a time factor, the telescope's position or location on the earth's surface, whether or not the telescope is level or any indicia relating to either North or South. Drift alignment offers a complete solution to the determination of a precise relationship between the telescope coordinate system and the celestial coordinate system by evaluating an object's actual track through the night sky and determining its proper motion. However, the drift alignment methodology is unable to provide the basis for local sidereal time calculations and therefore, is unable to automatically direct the telescope system to an externally specified right ascension (RA) coordinate, unless additional data, such as an object's identity, is supplied.

One additional sighting operation, in accordance with the invention, is all that is necessary to derive local sidereal time information from an initial alignment based on the above-discussed drift alignment procedure. Once the relative movement of the celestial coordinate system with respect to the telescope coordinate system is determined, using the drift alignment procedure, a user slews the telescope system, using the system's hand box controller, to the celestial pole. Once pointed at the pole, the orientation of the pole star clusters can be resolved, using an electronic imager, and their rotational aspect can be defined in a manner similar to reading the hands of a clock. Once the rotational orientation of the pole star clusters is determined, telescope system orientation is complete and the telescope system now understands not only the relative movement of the celestial coordinate system with respect to the telescope coordinate system, but also its absolute rotational position with respect to an observer. Thus, the telescope system can be aligned without the user's having to enter any numeric data and without having to engage in a time consuming leveling process.

A manual equivalent to this particular alignment procedure might involve leveling the telescope, defining an altitude reference point by pointing the telescope at the horizon, for example, defining an azimuth reference point by pointing the telescope North, for example, and then pointing the telescope at a known star with known RA and Dec celestial coordinates. An alternative manual equivalent might be to enter an observer's local time, date and terrestrial location (latitude and longitude) and subsequently have the telescope slew very close to an automatically selected star for final synchronization. As can be seen, the manual equivalent alignment procedures require either a fair knowledge of the night sky (in order to point to a known star) or a fair knowledge of time and position information (latitude and longitude for example). Information of this type is not always easily obtainable by first-time telescope system users. Accordingly, the foregoing inventive alignment systems offer an interesting and interactive approach to telescope alignment that only requires a user to be able to follow the motion of the star through the heavens and not concern themselves with remembering or entering numeric data.

It should be understood, therefore that initialization, orientation and alignment systems operative in the context of a fully automated telescope system, are not limited to the particular telescope configurations and embodiments described. Those having skill in the art will immediately recognize that sequences of steps may be re-arranged, inverted or otherwise modified without departing from the scope and spirit of the invention. Accordingly, the invention is to be defined only with regard to the appended claims.

What is claimed is:

1. A method of aligning an optical system by tracking a celestial objects' drift, the method comprising:
    monitoring movement of a celestial object with an observation system by electronically processing image data indicative of said movement or by electronically capturing movement of said observation system when said observation system tracts said movement of said celestial object; and
    electronically determining a relationship between said observation system and a celestial coordinate system based on a direction of said movement of said celestial object and a magnitude indicative of said movement of said celestial object.

2. The method of claim 1, wherein the monitoring comprises electronically deriving movement vectors.

3. The method of claim 2, wherein the deriving movement vectors comprises electronically identifying the direction and the magnitude.

4. The method of claim 3, wherein the identifying comprises manually adjusting a positioning system or manually inputting position system adjustments to follow the movement of the celestial object.

5. The method of claim 1, wherein the determining a relationship comprises electronically determining an orientation of the observation system with respect to the celestial coordinate system when the celestial object is a known celestial object in the celestial coordinate system.

6. The method of claim 5, wherein determining the orientation includes electronically determining local sidereal time.

7. A method of drift aligning an optical system, the method comprising;
    stewing an optical system to include a celestial object within a field of view of the optical system;
    electronically acquiring data indicative of movement of the celestial object;
    electronically processing said data to at least partially determine a relationship between said optical system and a celestial coordinate system based on a direction of said movement and a magnitude indicative of said movement of the celestial object;
    using said relationship, electronically selecting a known celestial object; and
    using said relationship, guiding a user in slewing or electronically stewing said optical system to include said known celestial object within said field of view.

8. The method of claim 7, wherein said electronically acquiring data indicative of said movement comprises at least one of electronically acquiring image data and electronically tracking movement of said optical system as said optical system tracks said movement of said celestial object.

* * * * *

UNITED STATES PATENT AND TRADEMARK OFFICE
CERTIFICATE OF CORRECTION

PATENT NO. : 7,221,527 B2
APPLICATION NO. : 11/189005
DATED : May 22, 2007
INVENTOR(S) : Baun et al.

It is certified that error appears in the above-identified patent and that said Letters Patent is hereby corrected as shown below:

At page 2, column 1 (Other Publications), line 10, please delete ""Partical" and insert -- "Practical --, therefor.

At page 2, column 1 (Other Publications), line 10, please delete "Duffet-" and insert -- Duffett- --, therefor, At page 2, column 1 (Other Publications), line 11, please delete "Cmabridge" and insert -- Cambridge --, therefor.

At page 2, column 1 (Other Publications), line 17, please delete "intiated" and insert -- initiated --, therefor.

At page 2, column 1 (Other Publications), line 18, please delete "node4/html;" and insert -- node4.html; --, therefor.

At page 2, column 1 (Other Publications), line 19, please delete "Wars" and insert -- Ware --, therefor.

At page 2, column 1 (Other Publications), line 20, please delete "Accessiories"" and insert -- Accessories" --, therefor.

At page 2, column 2 (Other Publications), line 6, please delete "magezine," and insert -- magazines, --, therefor.

At page 2, column 2 (Other Publications), line 10, please delete "2001):" and insert -- 2001); --, therefor.

At page 2, column 2 (Other Publications), line 12, please delete "ww." and insert -- www. --, therefor.

At page 2, column 2 (Other Publications), line 14, please delete "/html" and insert -- .html --, therefor.

At page 2, column 2 (Other Publications), line 16, please delete "Editiors" and insert -- Editors --, therefor.

At page 2, column 2 (Other Publications), line 20, please delete "2001;" and insert -- 2001;) --, therefor.

UNITED STATES PATENT AND TRADEMARK OFFICE
CERTIFICATE OF CORRECTION

PATENT NO. : 7,221,527 B2
APPLICATION NO. : 11/189005
DATED : May 22, 2007
INVENTOR(S) : Baun et al.

It is certified that error appears in the above-identified patent and that said Letters Patent is hereby corrected as shown below:

At page 2, column 2 (Other Publications), line 21, please delete "Utima" and insert -- Ultima --, therefor.

At page 2, column 2 (Other Publications), line 24, please delete ""Telescope" and insert -- "Telescopes --, therefor.

At page 2, column 2 (Other Publications), line 30, please delete "Telescrope" and insert -- Telescope --, therefor.

At page 2, column 2 (Other Publications), line 30, please delete "Skywatchin" and insert -- Skywatching --, therefor.

At page 2, column 2 (Other Publications), line 48, please delete "Motor" and insert -- Motion --, therefor.

At page 3, column 1 (Other Publications), line 36, please delete ".1x1x200" and insert -- .1x200 --, therefor.

At page 3, column 2 (Other Publications), line 18, please delete "Astronomy ," and insert -- Astronomy, --, therefor. (Consider Space)

At page 3, column 2 (Other Publications), line 22, please delete "curcuit" and insert -- circuit --, therefor.

At page 3, column 2 (Other Publications), line 26, please delete ","(Apr." and insert -- ," (Apr. --, therefor. (Consider Space).

At page 3, column 2 (Other Publications), line 27, please delete "Aćomag" and insert -- Aćromag --, therefor.

At column 22, line 34 (Approx.), please delete "very-close" and insert -- very close --, therefor.

At column 24, line 46 (Approx.), in claim 1, please delete "tracts" and insert -- tracks --, therefor.

UNITED STATES PATENT AND TRADEMARK OFFICE
CERTIFICATE OF CORRECTION

PATENT NO. : 7,221,527 B2
APPLICATION NO. : 11/189005
DATED : May 22, 2007
INVENTOR(S) : Baun et al.

It is certified that error appears in the above-identified patent and that said Letters Patent is hereby corrected as shown below:

At column 25, line 5, in claim 7, please delete "comprising;" and insert -- comprising: --, therefor.

At column 25, line 6, in claim 7, please delete "stewing" and insert -- slewing --, therefor.

Signed and Sealed this

Twelfth Day of August, 2008

JON W. DUDAS
*Director of the United States Patent and Trademark Office*